US006778454B2

(12) United States Patent
Duh et al.

(10) Patent No.: US 6,778,454 B2
(45) Date of Patent: *Aug. 17, 2004

(54) FIFO MEMORY DEVICES THAT SUPPORT ALL COMBINATIONS OF DDR AND SDR READ AND WRITE MODES

(75) Inventors: Jiann-Jeng Duh, San Jose, CA (US); Mario Fulam Au, Fremont, CA (US)

(73) Assignee: Integrated Device Technology, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/459,224

(22) Filed: Jun. 11, 2003

(65) Prior Publication Data

US 2003/0206475 A1 Nov. 6, 2003

Related U.S. Application Data

(63) Continuation of application No. 09/972,265, filed on Oct. 5, 2001.
(60) Provisional application No. 60/314,393, filed on Aug. 23, 2001.

(51) Int. Cl.$^7$ ................................................. G11C 7/00
(52) U.S. Cl. ........................ 365/221; 365/191; 365/233
(58) Field of Search ................................ 365/191, 221, 365/233

(56) References Cited

U.S. PATENT DOCUMENTS

| 5,261,064 A | 11/1993 | Wyland |
| 5,546,347 A | 8/1996 | Ko et al. |
| 5,663,910 A | 9/1997 | Ko et al. |
| 6,094,375 A | 7/2000 | Lee |
| 6,115,760 A | 9/2000 | Lo et al. |
| 6,118,835 A | 9/2000 | Barakat et al. |
| 6,134,180 A | 10/2000 | Kim et al. |
| 6,147,926 A | 11/2000 | Park |
| 6,151,273 A | 11/2000 | Iwamoto et al. |
| 6,154,418 A | 11/2000 | Li |
| 6,154,419 A | 11/2000 | Shakkarwar |
| 6,201,760 B1 | 3/2001 | Yun et al. |
| 6,233,199 B1 | 5/2001 | Ryan |
| 6,240,031 B1 | 5/2001 | Mehrotra et al. |
| 6,240,042 B1 | 5/2001 | Li |
| 6,252,441 B1 | 6/2001 | Lee et al. |
| 6,259,652 B1 | 7/2001 | Heyne et al. |
| 6,263,410 B1 | 7/2001 | Kao et al. |
| 6,269,413 B1 | 7/2001 | Sherlock |
| 6,272,065 B1 | 8/2001 | Kim |
| 6,279,073 B1 | 8/2001 | McCracken et al. |

(List continued on next page.)

FOREIGN PATENT DOCUMENTS

| EP | 0 421 627 A2 | 9/1990 |
| EP | 0 978 842 A1 | 2/2000 |
| JP | 08202618 | 8/1996 |

OTHER PUBLICATIONS

Invitation to Pay Additional Fees, Annex to Form PCT/ISA/206, Communication Relating to the Results of the Partial International Search, PCT/US02/26516, Oct. 13, 2003.

Primary Examiner—Van Thu Nguyen
(74) Attorney, Agent, or Firm—Myers Bigel Sibley & Sajovec

(57) ABSTRACT

First-in first-out (FIFO) memory devices are configured to support all four of the following FIFO memory modes: (1) DDR write with DDR read, (2) DDR write with SDR read, (3) SDR write with DDR read and (4) SDR write with SDR read. These FIFO memory devices provide flexible ×4N, ×2N and ×N bus matching on both read and write ports and enable data to be written and read on both rising and falling edges of the write and read clock signals. Custom flag generation and retransmit circuitry is also provided that can efficiently handle any width DDR write mode with any width SDR read mode or any width SDR write mode with any width DDR read mode.

21 Claims, 9 Drawing Sheets

U.S. PATENT DOCUMENTS

| | | |
|---|---|---|
| 6,282,128 B1 | 8/2001 | Lee |
| 6,327,216 B1 | 12/2001 | Ryan |
| 6,330,636 B1 | 12/2001 | Bondurant et al. |
| 6,337,809 B1 | 1/2002 | Kim et al. |
| 6,337,830 B1 | 1/2002 | Faue |
| 6,338,103 B1 | 1/2002 | Kirihata |
| 6,339,558 B1 | 1/2002 | Ioki |
| 6,356,506 B1 | 3/2002 | Ryan |
| 6,377,071 B1 | 4/2002 | Wang et al. |
| 6,381,194 B2 | 4/2002 | Li |
| 6,381,661 B1 | 4/2002 | Messerly et al. |
| 6,381,684 B1 | 4/2002 | Hronik et al. |
| 6,400,642 B1 | 6/2002 | Mehrotra et al. |
| 6,411,561 B2 | 6/2002 | Ayukawa et al. |
| 6,438,066 B1 | 8/2002 | Ooishi et al. |
| 6,477,110 B2 | 11/2002 | Yoo et al. |
| 6,522,599 B2 * | 2/2003 | Ooishi et al. ............... 365/233 |
| 6,671,787 B2 * | 12/2003 | Kanda et al. ............... 711/167 |
| 2001/0004335 A1 | 6/2001 | Murakami |
| 2001/0014053 A1 | 8/2001 | Li |
| 2001/0029558 A1 | 10/2001 | Kobara et al. |
| 2001/0054121 A1 | 12/2001 | Proch et al. |
| 2002/0048201 A1 | 4/2002 | Garg |
| 2002/0071332 A1 * | 6/2002 | Nishiyama et al. .... 365/230.01 |
| 2002/0089927 A1 | 7/2002 | Fischer et al. |

* cited by examiner

FIFO MEMORY DEVICES THAT SUPPORT ALL COMBINATIONS OF DDR AND SDR READ AND WRITE MODES

REFERENCE TO PRIORITY APPLICATION

This application is a continuation of U.S. application Ser. No. 09/972,265, filed Oct. 5, 2001, which claims priority to U.S. Provisional Application Serial No. 60/314,393, filed Aug. 23, 2001, the disclosures of which are hereby incorporated herein by reference.

FIELD OF THE INVENTION

The present invention relates to integrated circuit memory devices and, more particularly, to integrated circuit first-in first-out (FIFO) memory devices.

BACKGROUND OF THE INVENTION

Semiconductor memory devices can typically be classified on the basis of memory functionality, data access patterns and the nature of the data storage mechanism. For example, distinctions are typically made between read-only memory (ROM) devices and read-write memory (RWM) devices. The RWM devices typically have the advantage of offering both read and write functionality with comparable data access times. Typically, in RWM devices, data is stored either in flip-flops for "static" memory devices or as preset levels of charge on a capacitor in "dynamic" memory devices. As will be understood by those skilled in the art, static memory devices retain their data as long as a supply of power is maintained, however, dynamic memory devices require periodic data refreshing to compensate for potential charge leakage. Because RWM devices use active circuitry to store data, they belong to a class of memory devices known as "volatile" memory devices because data stored therein will be lost upon termination of the power supply. ROM devices, on the other hand, may encode data into circuit topology (e.g., by blowing fuses, removing diodes, etc.). Because this latter type of data storage may be hardwired, the data cannot be modified, but can only be read. ROM devices also typically belong to a class of memory devices known as "nonvolatile" memory devices because data stored therein will typically not be lost upon termination of the power supply. Other types of memory devices that have been more recently developed are typically referred to as nonvolatile read-write (NVRWM) memory devices. These types of memory devices include EPROM (erasable programmable read-only memory), $E^2$PROM (electrically erasable programmable read-only memory), and flash memories, for example.

An additional memory classification is typically based on the order in which data can be accessed. Here, most memory devices belong to the random-access class, which means that memory locations can be read from or written to in random order. Notwithstanding the fact that most memory devices provide random-access, typically only random-access RWM memories use the acronym RAM. Alternatively, memory devices may restrict the order of data access to achieve shorter data access times, reduce layout area and/or provide specialized functionality. Examples of such specialized memory devices include buffer memory devices such as first-in first-out (FIFO) memory devices, last-in first-out (LIFO or "stack") memory devices, shift registers and content-addressable memory (CAM) devices.

A final classification of semiconductor memories is based on the number of data input and data output ports associated with the memory cells therein. For example, although most memory devices have unit cells therein that provide only a single port, which is shared to provide an input and output path for transfer of data, memory devices with higher bandwidth requirements often have cells therein with multiple input and output ports. However, the addition of ports to unit memory cells typically increases the complexity and layout area requirements for these higher bandwidth memory devices.

Single-port memory devices are typically made using static RAM cells if fast data access times are a requirement, and dynamic RAM cells if low cost is a primary requirement. Many FIFO memory devices use dual-port RAM based designs with self-incrementing internal read and write pointers to achieve fast fall-through capability. As will be understood by those skilled in the art, fall-through capability is typically measured as the time elapsing between the end of a write cycle into a previously empty FIFO and the time an operation to read that data may begin. Exemplary FIFO memory devices are more fully described and illustrated at section 2.2.7 of a textbook by A. K. Sharma entitled "Semiconductor Memories: Technology, Testing and Reliability", IEEE Press (1997).

In particular, dual-port SRAM-based FIFOs typically utilize separate read and write pointers to advantageously allow read and write operations to occur independently of each other and achieve fast fall-through capability as data written into a dual-port SRAM FIFO can be immediately accessed for reading. Since these read and write operations may occur independently, independent read and write clocks having different frequencies may be provided to enable the FIFO to act as a buffer between peripheral devices operating at different rates. Unfortunately, a major disadvantage of typical dual-port SRAM-based FIFOs is the relatively large unit cell size for each dual-port SRAM cell therein. Thus, for a given semiconductor chip size, dual-port buffer memory devices typically provide less memory capacity relative to single-port buffer memory devices. For example, using a standard DRAM cell as a reference unit cell consuming one (1) unit of area, a single-port SRAM unit cell typically may consume four (4) units of area and a dual-port SRAM unit cell typically may consume sixteen (16) units of area. Moreover, the relatively large unit cells of a dual-port SRAM FIFO limit the degree to which the number of write operations can exceed the number of read operations, that is, limit the capacity of the FIFO.

To address these limitations of dual-port buffer memory devices, single-port buffer memory devices have been developed to, among other things, achieve higher data capacities for a given semiconductor chip size. For example, U.S. Pat. No. 5,546,347 to Ko et al. entitled "Interleaving Architecture And Method For A High Density FIFO", assigned to the present assignee, discloses a memory device that has high capacity and uses relatively small single-port memory cells. However, the use of only single port memory cells typically precludes simultaneous read and write access to data in the same memory cell, which means that single-port buffer memory devices typically have slower fall-through time than comparable dual-port memory devices. Moreover, single-port buffer memory devices may use complicated arbitration hardware to control sequencing and queuing of reading and writing operations.

U.S. Pat. No. 5,371,708 to Kobayashi also discloses a FIFO memory device containing a single-port memory array, a read data register for holding read data from the memory array and a write data register for holding write data to the memory array. A bypass switch is also provided for transferring data from the write data register to the read data register so that the memory array can be bypassed during testing of the FIFO to detect the presence of defects therein. However, like the above-described single-port buffer memory devices, simultaneous read and write access to data is not feasible.

Commonly assigned U.S. Pat. Nos. 5,978,307, 5,982,700 and 5,998,478 disclose FIFO memory devices having generally fast fall-through capability. These memory buffers contain a tri-port memory array of moderate capacity having nonlinear columns of tri-port cells therein, which collectively form four separate registers, and a substantially larger capacity supplemental memory array (e.g., DRAM array) having cells therein with reduced unit cell size. The tri-port memory array has a read port, a write port and a bidirectional input/output port. The tri-port memory array communicates internally with the supplemental memory array via the bidirectional input/output port and communicates with external devices (e.g., peripheral devices) via the read and write data ports. Efficient steering circuitry is also provided by a bidirectional crosspoint switch that electrically couples terminals (lines IO and IOB) of the bidirectional input/output port in parallel to bit lines (BL and BLB) in the supplemental memory array during a write-to-memory time interval and vice versa during a read-from-memory time interval.

Notwithstanding the above described FIFO memory devices, there still exists a need to develop higher speed FIFO memory devices having expanded functionality and increased data capacity. The also exists a need for FIFO memory devices that provide faster data transfer for such applications as network, video, telecommunications and data communications.

SUMMARY OF THE INVENTION

First-in first-out (FIFO) memory devices according to first embodiments of the present invention include a plurality of memory devices that are configured to support any combination of dual data rate (DDR) or single data rate (SDR) write modes that operate in-sync with a write clock signal (WCLK) and DDR or SDR read modes that operate in-sync with a read clock signal (RCLK). These FIFO memory devices also provide flexible x4N, x2N and xN bus matching on both read and write ports and enable data to be written and read on both rising and falling edges of the write and read clock signals. These FIFO memory devices represent a significant alternative to increasing data rate without extending the width of input or output busses or the internal speed of the devices. They are also effective in applications that require buffering large amounts of data and matching busses of unequal sizes. Custom flag generation and retransmit circuitry is also provided that can efficiently handle any combination of DDR and SDR read and write modes.

These FIFO memory devices may include write control circuitry that provides the plurality of memory devices with write data in-sync with rising and falling edges of the write clock signal when the FIFO memory device is disposed in the DDR write mode. Likewise, read control circuitry may be included that receives read data from the plurality of memory devices in-sync with rising and falling edges of the read clock signal when the FIFO memory device is disposed in the DDR read mode. The write control circuitry may also be configured to provide the plurality of memory devices with write data in-sync with leading edges of the write clock signal when the FIFO memory device is disposed in a single data rate (SDR) write mode. The read control circuitry may be configured to receive read data from the plurality of memory devices in-sync with leading edges of the read clock signal when the FIFO memory device is disposed in a single data rate (SDR) read mode.

According to one aspect of these first embodiments, the plurality of memory devices may include first and second memory devices that, during the DDR write mode, receive write data in an alternating back-and-forth sequence on alternating rising and falling edges of the write clock signal. These first and second memory devices may also provide read data in an alternating back-and-forth sequence during the DDR read mode. According to another aspect of these first embodiments, the plurality of memory devices include first, second, third and fourth memory devices configured in a preferred quad arrangement. Moreover, when operating in a DDR write mode that supports a x4N write data width, where N is a positive integer, the write control circuitry provides each of the memory devices in the quad arrangement with 4N bits of write data in a sequence that is synchronized with leading and trailing edges of two (2) consecutive cycles of the write clock signal. Alternatively, when operating in a DDR write mode that supports a x2N write data width, the write control circuitry provides each of the memory devices in the quad arrangement with 4N bits of write data in a sequence that is synchronized with trailing edges of four (4) consecutive cycles of the write clock signal. Finally, when operating in a DDR write mode that supports a xN write data width, the write control circuitry provides each of the memory devices in the quad arrangement with 4N bits of write data in a sequence that is synchronized with trailing edges of every other one of eight (8) consecutive cycles of the write clock signal.

According to still further aspects of these first embodiments, when operating in an SDR write mode and supporting the x4N write data width, the write control circuitry provides each of the memory devices in the quad arrangement with 4N bits of write data in a sequence that is synchronized with leading edges of four (4) consecutive cycles of the write clock signal. When operating in an SDR write mode and supporting the x2N write data width, the write control circuitry provides each of the memory devices in the quad arrangement with 4N bits of write data in a sequence that is synchronized with leading edges of every other one of eight (8) consecutive cycles of the write clock signal. Finally, when operating in an SDR write mode and supporting the xN write data width, the write control circuitry provides each of the memory devices in the quad arrangement with 4N bits of write data in a sequence that is synchronized with leading edges of every fourth one of sixteen (16) consecutive cycles of the write clock signal. Analogous operations are also performed when the FIFO memory devices are operating in any combination of DDR and SDR read modes.

First-in first-out (FIFO) memory devices according to second embodiments of the present invention include a plurality of memory devices and an input multiplexer that provides the plurality of memory devices with write data in-sync with rising and falling edges of a write clock signal when the FIFO memory device is disposed in a dual data rate (DDR) write mode. The FIFO memory devices may also include an output multiplexer that receives read data from the plurality of memory devices in-sync with rising and falling edges of a read clock signal when the FIFO memory device is disposed in a DDR read mode. The input multiplexer may comprise an input data buffer and a master latch electrically coupled to an output of the input data buffer. A first bus matching circuit may also be provided that supports any combination of x4N, x2N and xN write modes. This first bus matching circuit is electrically coupled to an output of the master latch. A slave latch is also provided. This slave latch has inputs that are electrically coupled to corresponding outputs of the first bus matching circuit. The outputs of the slave latch are electrically coupled to the plurality of memory devices.

The output multiplexer may also include a second bus matching circuit having inputs that are electrically coupled to receive read data from the plurality of memory devices. First and second output registers may also be provided having inputs that are electrically coupled to first and second output ports of the second bus matching circuit. According to a preferred aspect of these second embodiments, the output multiplexer includes a redirect multiplexer having first and second inputs that are electrically coupled to the first and second output ports and an output electrically coupled to an input of the first output register. This redirect multiplexer is preferably responsive to a single date rate select signal. This single data rate select signal enables the second output register to be bypassed when the FIFO memory device is disposed in a single data rate (SDR) read mode of operation.

First-in first-out (FIFO) memory devices according to third embodiments of the present invention may include a plurality of multi-port cache memory devices that are configured to support any combination of dual data rate (DDR) or single data rate (SDR) write modes and DDR or SDR read modes. These multi-port cache memory devices may include first and second quad-port cache memory devices. Each of these quad-port cache memory devices may include a data input register, a multiplexer and an output register. The data input register may have an input electrically coupled to a first port of the quad-port cache memory device and an output electrically coupled to a second port of the quad-port cache memory device. The multiplexer is responsive to at least one select signal and has a first input electrically coupled to the output of the data input register and a second input electrically coupled to a third port of the quad-port cache memory device. The output register has an input electrically coupled to an output of the multiplexer and an output electrically coupled to a fourth port of the quad-port cache memory device.

First-in first-out (FIFO) memory devices according to fourth embodiments of the present invention may include a plurality of memory devices that are configured to support a dual data rate (DDR) read mode that operates in-sync with leading and trailing edges of a read clock signal and read control circuitry that can handle retransmit operations. This read control circuitry may mark data read from the FIFO memory device in response to a trailing edge of a first cycle of the read clock signal during the DDR read mode. This marking operation may be responsive to an active mark signal. The read control circuitry may also perform retransmit operations that are responsive to an active retransmit signal. These retransmit operations may include retransmitting data in pairs by commencing the retransmission with data previously read from the FIFO memory device in response to a leading edge of the first cycle of the read clock signal before following with the marked read data that was originally read on the trailing edge of the first cycle of the read clock signal.

The embodiments of the present invention also preferably include flag circuitry that can address empty, almost empty, full and almost full conditions within a FIFO memory device having DDR read and write modes. This flag circuitry preferably evaluates an empty (or almost empty) condition in the FIFO memory device by comparing a write counter value that is generated off a trailing edge of the write clock signal against a read counter value that is generated off a leading edge of the read clock signal when the FIFO memory device is disposed in the DDR write mode. This flag circuitry may also evaluate a full (or almost full) condition in the FIFO memory device by comparing a read counter value that is generated off a trailing edge of the read clock signal against a write counter value that is generated off a leading edge of the write clock signal when the FIFO memory device is disposed in the DDR read mode. Other FIFO memory device embodiments may also be provided that include more than two (2) or four (4) memory devices that operate in tandem to provide any combination of DDR and SDR modes.

DESCRIPTION OF PREFERRED EMBODIMENTS

Figure 1:
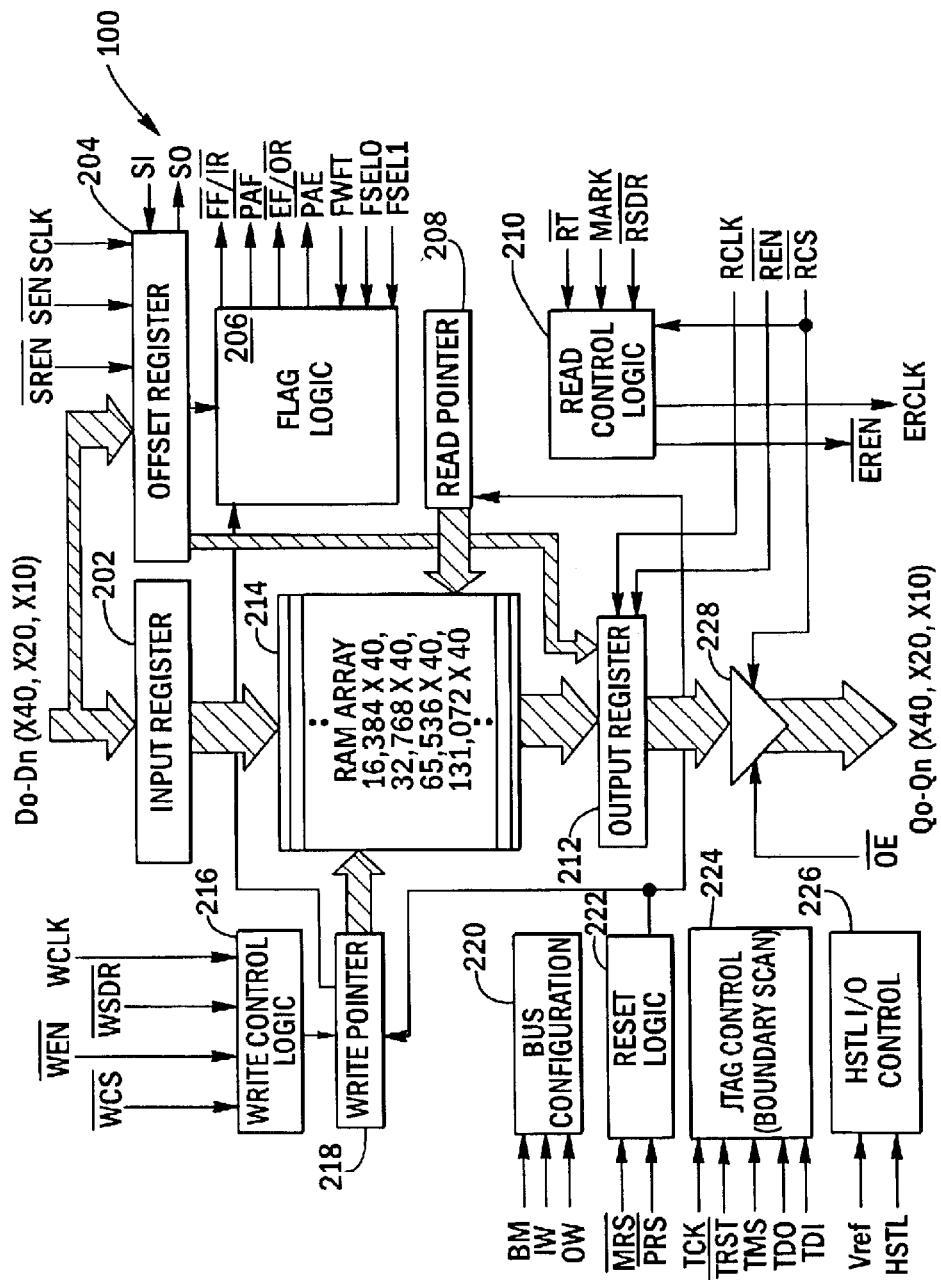
FIG. 1 is a high-level block diagram of a first-in first-out (FIFO) memory device according to an embodiment of the present invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be through and complete, and will fully convey the scope of the invention to those skilled in the art. Like reference numerals refer to like elements throughout and signal lines and signals thereon may be referred to by the same reference characters. The prefix symbol "/" attached to a signal name indicates that the signal is an active low signal. Active low signals may be changed to active high signals and the description of such signals as active low signals should not be construed as limiting the embodiments described herein to the use of only such signals.

First-in first-out (FIFO) memory devices 100 according to first embodiments of the present invention may include a data path defined by an input register 202, a core memory block 214, which may contain a plurality of memory devices therein, and an output register 212 that provides data to an output buffer 228. An offset register 204 having serial in SI and serial out SO pins is also provided. This offset register 204 is provided for retaining programmable offset information that is relevant to the flag logic circuit 206. The offset register 204 may also provide a parallel input-to-output data path that bypasses the core memory block 214. A write control logic circuit 216 and a write pointer 218 are also provided along with a read control logic circuit 210 and a read pointer 208. The FIFO memory devices 100 also include bus configuration logic 220, a reset logic circuit 222 and JTAG boundary scan control circuitry 224. An HSTL I/O control circuit 226 is also provided. The operation of these components of the FIFO memory devices 100 is also more fully described herein and in U.S. Application Serial. No. 60/314,393, filed Aug. 23, 2001, entitled "FIFO Memory Device Having Dual Data Rate (DDR) Capability," the disclosure of which is hereby incorporated herein by reference.

These FIFO memory devices 100 are configured to support any combination of dual data rate (DDR) or single data rate (SDR) write modes that operate in-sync with a write clock signal (WCLK) and DDR or SDR read modes that operate in-sync with a read clock signal (RCLK). As illustrated by FIG. 1, these FIFO memory devices 100 provide flexible x4N, x2N and xN bus matching on the write (data input) and read (data output) ports, where N is a positive integer (e.g., N=10). Advantageously, these FIFO memory devices 100 support writing and reading of data on both rising and falling edges of the write and read clock signals. Custom flag generation and mark and retransmit circuitry is also provided that can efficiently handle any combination of DDR and SDR read and write modes. These FIFO memory devices 100 also provide extended memory capacity. In particular, the FIFO memory devices 100 preferably include first, second, third and fourth memory devices that are configured in a preferred quad arrangement. In addition to providing high capacity, this quad arrangement increases the minimum acceptable read and write cycle times by increasing the spacing between consecutive read and write accesses to each memory device. FIFO memory devices 100, according to other embodiments of the present invention, may also include arrangements based on two (2), six (6), eight (8) or other even and odd combinations of memory devices.

Each FIFO memory device 100, according to the first embodiment, may have a data input port (Dn) and a data output port (Qn), both of which can assume either a 40-bit, 20-bit, or a 10-bit data width. These data widths are determined by the state of external control pins: Input Width (IW), Output Width (OW), and Bus-Matching (BM) pin, during a Master Reset cycle. The input port is controlled by a Write Clock (WCLK) input and a Write Enable (/WEN) input. Data present on the Dn data inputs can be written into the FIFO on every rising and falling edge of WCLK when /WEN is asserted and the Write Single Data Rate (/WSDR) pin is held HIGH. Data can be selected to write only on the rising edges of WCLK if /WSDR is asserted. The Write Enable input /WEN should be a controlled signal and not tied to ground, because /WEN should be HIGH during the time when the Master Reset (/MRS) pulse is LOW. In addition, the IWSDR pin should be tied HIGH or LOW, because it is not a controlled signal and typically cannot be changed during FIFO operation. Write operations can be selected for either Single or Double Data Rate mode. For Single Data Rate operation, writing into the FIFO requires the Write Single Data Rate (/WSDR) pin to be asserted. Data will be written into the FIFO memory device 100 on the rising edge of WCLK when the Write Enable (/WEN) is asserted. For Double Data Rate operations, writing into the FIFO memory device requires /WSDR to be deasserted. Data will be written into the FIFO on both rising and failing edges of WCLK when /WEN is asserted.

The output port Qn is controlled by a Read Clock (RCLK) input and a Read Enable (/REN) input. Data is read from the FIFO on every rising and falling edge of RCLK when /REN is asserted and the Read Single Data Rate (/RSDR) pin is held HIGH. Data can be selected to read only on the rising edges of RCLK if /RSDR is asserted. The READ ENABLE input /REN should be a controlled signal and not tied to ground, because /REN should be HIGH during the time when the Master Reset (/MRS) pulse is LOW. In addition, the /RSDR pin should be tied HIGH or LOW, because it typically cannot be changed during FIFO operation. Read operations can be selected for either Single or Double Data Rate mode. Similar to the write operations, reading from the FIFO in single data rate requires the Read Single Data Rate (/RSDR) pin to be asserted. Data will be read from the FIFO on the rising edge of RCLK when the Read Enable (/REN) is asserted. For Double Data Rate operations, reading into the FIFO requires /RSDR to be deasserted. Data will be read out of the FIFO memory device 100 on both rising and falling edges of RCLK when /REN is asserted. The frequencies of both the RCLK and WCLK signals may vary from a low frequency to the maximum frequency ($f_{MAX}$) with complete independence. There are typically no restrictions on the frequency of RCLK relative to WCLK.

The input port can be selected for either 2.5V LVTTL or HSTL operation. This operation is selected by the state of the HSTL input. A write chip select input (IWCS) is provided for use when the write port is in the HSTL mode. During HSTL operation, the /WCS input can be used to disable write port inputs, effectively disabling write operations. The output port can be selected for either 2.5V LVTTL or HSTL operation. This operation is selected by the state of the HSTL input. When the read port is setup for HSTL mode, the Read Chip Select (/RCS) input also has the benefit of disabling the read port inputs, providing additional power savings.

There is the option of selecting different data rates on the input and output ports of the FIFO memory device 100. There are a total of four combinations to choose from, Double Data Rate to Double Data Rate (DDR to DDR), DDR to Single Data Rate (DDR to SDR), SDR to DDR, and SDR to SDR. The rates can be set up using the PWSDR and /RSDR pins. For example, to set up the input to output combination of DDR to SDR, /WSDR will be HIGH and /RSDR will be LOW. Read and write operations are initiated on the rising edge of RCLK and WCLK, respectively, and not on the falling edge. If /REN or /WEN is asserted after a rising edge of WCLK or RCLK, respectively, no read or write operations will occur on the falling edge of that same clock pulse. When the FIFO memory device 100 is disposed in the DDR write mode, data is preferably always written in pairs on the rising and falling edges of WCLK. Data also is read in pairs when the FIFO memory device is disposed in the DDR read mode. This requirement of data being read or written in pairs impacts the flag and retransmit operations, as described more fully hereinbelow.

An Output Enable (/OE) input is provided for high-impedance control of the outputs. A read Chip Select (/RCS) input is also provided for synchronous enable/disable of the read port control input, /REN. The /RCS input is synchronized to the read clock, and also provides high-impedance controls to the Qn data outputs. When /RCS is disabled, /REN will be disabled internally and the data outputs will be in high-impedance states. Unlike the Read Chip Select signal however, /OE is not synchronous to RCLK. Outputs are high-impedanced shortly after a delay time when the /OE transitions from LOW to HIGH.

The Echo Read Enable (/EREN) and Echo Read Clock (/ERCLK) outputs are used to provide tighter synchronization between the data being transmitted from the Qn outputs and the data being received by the input device. These output signals from the read port are typically required for high-speed data communications. Data read from the read port is available on the output bus with respect to /EREN and ERCLK, which is useful when data is being read at high-speed where synchronization is important.

The FIFO memory devices 100 of FIG. 1 may operate in IDT Standard mode or First Word Fall Through (FWFT) mode. In IDT Standard mode, the first word written to an empty FIFO will not appear on the data output lines unless a specific read operation is performed. A read operation, which consists of activating /REN and enabling a rising RCLK edge, will shift the word from internal memory to the data output lines. In Double Data rate (DDR) mode, only the IDT Standard mode is available. In FWFT mode, the first word written into an empty FIFO is clocked directly to the data output lines after three transitions of RCLK. A read operation does not have to be performed to access the first word written to the FIFO. However, subsequent words written to the FIFO do require a LOW on /REN for access. The state of the FWFT input during Master Reset determines the timing mode in use. For applications requiring more data storage capacity than a single FIFO can provide, the FWFT timing mode permits depth expansion by chaining FIFOs in series (i.e. the data outputs of one FIFO are connected to the corresponding data inputs of the next). No external logic is required.

The FIFO memory device preferably has four flag pins, /ER(/OR) (Empty Flag or Output Read), /FF(/IR) (Full Flag or Input Ready), /PAE (Programmable Almost-Empty flag), and /PAF (Programmable Almost-Full flag). The /EF and /FF functions are selected in IDT Standard mode. The /IR and /OR functions are selected in FWFT mode. The /PAE and /PAF flags are always available for use, irrespective of timing mode. The /PAE and /PAF flags can be programmed independently to switch at any point in memory. Programmable offsets mark the location within the internal memory that activates the /PAE and /PAF flags and can only be programmed serially. To program the offsets, the serial input enable pin /SEN is made active and data can be loaded via the Serial Input (/SI) pin at the rising edge of the serial clock SCLK. To read out the offset registers serially, the serial read enable pin /SREN is set active and data can be read out via the Serial Output (SO) pin at the rising edge of SCLK. Four default offset settings are also provided, so that /PAE can be marked at a predefined number of locations from the empty boundary and the /PAF threshold can also be marked at similar predefined values from the full boundary. The default offset values are set during Master Reset by the state of the FSEL0 and FSEL1 pins.

The flag logic circuit 206 preferably evaluates an empty (or almost empty) condition in the FIFO memory device 100 by comparing a write counter (i.e., pointer) value that is generated off a trailing edge of an internal write clock signal (e.g., WCNTRCLK derived from WCLK) against a read counter (i.e., pointer) value that is generated off a leading edge of an internal read clock signal (e.g., RCNTRCLK derived from RCLK) when the FIFO memory device 100 is disposed in the DDR write mode. This flag logic circuit 206 may also evaluate a full (or almost full) condition in the FIFO memory device 100 by comparing a read counter value that is generated off a trailing edge of the internal read clock signal against a write counter value that is generated off a leading edge of the internal write clock signal when the FIFO memory device is disposed in the DDR read mode. Additional components and functional description of the flag logic circuit: 206 are illustrated and described at pages 51–56 of the aforementioned U.S. Application Serial. No. 60/314,393.

During Master Reset (/MRS), the following events occur: the read and write pointers are set to the first location of the internal FIFO memory, and the FWFT pin selects IDT Standard mode or FWFT mode. The Partial Reset signal (/PRS) also sets the read and write pointers to the first location of the memory. However, the timing mode (IDT Standard vs. FWFT) and the values stored in the programmable offset registers before Partial Reset remain unchanged. The flags are updated according to the timing mode and offsets in effect at the time of the partial reset. The Partial Reset signal /PRS is useful for resetting a device in mid-operation, when reprogramming programmable flags would be undesirable. The timing of the /PAE and /PAF flags are synchronous to RCLK and WCLK, respectively. The /PAE flag is asserted upon the rising edge of RCLK only and not WCLK. Similarly the /PAF flag is asserted and updated on the rising edge of WCLK only and not RCLK.

This device includes a Retransmit from Mark feature that utilizes two control inputs, MARK and /RT (Retransmit). If the MARK input is enabled with respect to RCLK, the memory location being read at that point will be marked. Any subsequent retransmit operation (when /RT goes LOW), will reset the read pointer to this "marked" location.

If, at any time, the FIFO is not actively performing an operation, the chip will automatically power down. Once in the power down state, the standby supply current consumption is minimized. Initiating any operation (by activating control inputs) will immediately take the device out of the power down state. A JTAG test port also is provided and the FIFO has fully functional boundary Scan features, compliant with IEEE 1449.1 Standard Test Access Port and Boundary Scan Architecture.

Retransmit from Mark Operation

The Retransmit from Mark feature allows FIFO data to be read repeatedly starting at a user-selected position. The FIFO memory device 100 is first put into a retransmit mode that will "mark" a beginning word and also set a pointer that will prevent ongoing FIFO write operations from over-writing retransmit data. The retransmit data can be read repeatedly any number of times from the "marked" position. The FIFO memory device 100 can be taken out of retransmit mode at any time to allow normal device operation. The "mark" position can be selected any number of times, each selection over-writing the previous mark location. In Double Data Rate, data will always be marked in pairs. If the data marked was read on a falling edge of RCLK, then the marked data will be the unit of data read from the rising and falling edge of that particular cycle of RCLK. FIG. 23 from the aforementioned U.S. Application Serial No. 60/314,393 provides a timing diagram for this retransmit mode. Retransmit operation is available in both IDT standard and FWFT modes.

During the IDT standard mode, the FIFO memory device 100 is put into retransmit mode by a Low-to-High transition on RCLK when the MARK input is HIGH and /EF is HIGH. The rising RCLK edge marks the data present in the FIFO output register as the first retransmit data. Again, the data is marked in pairs. Thus if the data marked was read on the falling edge of RCLK, the first part of retransmit will read out the data originally read on the rising edge of RCLK, followed by the data originally read on the falling edge (the marked data) of the same cycle of the read clock signal RCLK. The FIFO remains in retransmit mode until a rising edge on RCLK occurs while MARK is LOW.

Once a marked location has been set, a retransmit can be initiated by a rising edge on RCLK while the Retransmit input (/RT) is LOW. The device indicates the start of retransmit setup by setting /EF LOW, which prevents normal read operations. When /EF goes HIGH, retransmit setup is complete and read operations may begin starting with the first unit of data at the MARK location. Write operations may continue as normal during all retransmit functions, however write operations that cross over the "marked" location will be prevented.

During FWFT mode, the FIFO memory device 100 is put into retransmit mode by a rising RCLK edge when the MARK input is HIGH and /OR is LOW. The rising RCLK edge marks the data present in the FIFO output register as the first retransmit data. The FIFO remains in retransmit mode until a rising RCLK edge occurs while MARK is LOW. Once a marked location has been set, a retransmit can be initiated by a rising RCLK edge while the Retransmit input (/RT) is LOW. The device indicates the start of retransmit setup by setting /OR HIGH, preventing read operations. When /OR goes LOW, retransmit setup is complete and on the next rising RCLK edge, after /RT goes HIGH, the contents of the first retransmit location are loaded onto the output register. Since FWFT mode is selected, the first word appears on the outputs regardless of /REN. A LOW on /REN is not required for the first word. Reading all subsequent words requires a LOW on /REN to enable the rising RCLK edge. FIG. 24 from the aforementioned U.S. Application Serial No. 60/314,393 provides a timing diagram for the retransmit in the FWFT mode. Before a retransmit can be performed, there should beat least 1280 bits of data between the write pointer and the marked location. These 1280 bits of data correspond to 32 pieces of 40-bit data, 64 pieces of 20-bit data or 128 pieces of 10-bit data. Once the marked location has been set, the write pointer will not increment past the marked location, preventing overwrites of retransmit data.

The data and control signals illustrated by the FIFO memory device 100 of FIG. 1 will now be more fully described.

Data IN (D0–D39)

(D0–D39) are data inputs for the 40-bit wide data, (D0–D19) are data inputs for the 20-bit wide data, or (D0–D9) are data inputs for 10-bit wide data. Other data widths are also possible.

Master Reset (/MRS)

A Master Reset is accomplished whenever the /MRS input is taken to a LOW state. This operation sets the internal read and write pointers to the first location of the memory device. /PAE will go LOW and /PAF will go HIGH. If FWFT is LOW during Master Reset, then IDT Standard mode along with /EF and /FF are selected. /EF will go LOW and /FF will go HIGH. If FWFT is HIGH, then the First Word Fall Through (FWFT) mode, along with /IR and /OR, are selected. /OR will go HIGH and /IR will go LOW. All control settings such as OW, IW, BM, FWFT, FSEL0 and FSEL1 are defined during the Master Reset cycle. During a Master Reset, the output register 212 is initialized to all zeros. A Master Reset is required after power up before a write operation can take place. Aspects of the Master Reset operation are more fully illustrated by FIG. 8 of the aforementioned U.S. Application Serial No. 60/314,393.

Partial Reset (/PRS)

A Partial Reset is accomplished whenever the /PRS input is taken to a LOW state. As in the case of the Master Reset, the internal read and write pointers are set to the first location of the memory device. /PAE goes LOW and /PAF goes HIGH. Whichever mode was active at the time of Partial Reset will remain active after Partial Reset. If IDT Standard mode is active, then /FF will go HIGH and /EF will go LOW. If the First Word Fall Through mode is active, then /OR will go HIGH and /IR will go LOW. Following Partial Reset, all values in the offset registers remain unchanged. The output register is initialized to all zeros. Partial Reset is useful for resetting the read and write pointers to zero without affecting the values of the programmable flag offsets and the timing mode of the FIFO. These aspects of the Partial Reset are more fully illustrated by FIG. 9 of the aforementioned U.S. Application Serial No. 60/314,393.

First Word Fall Through (FWFT)

During Master Reset, the state of the FWFT input determines whether the device will operate in IDT Standard mode or First Word Fall Through (FWFT) mode. If, at the time of the Master Reset, FWFT is LOW, then IDT Standard mode will be selected. This mode uses the Empty Flag (/EF) to indicate whether or not there are any words present in the FIFO memory device 100. It also uses the Full Flag function (/FF) to indicate whether or not the FIFO memory device 100 has any free space for writing. In IDT Standard mode, every word read from the FIFO, including the first, should be requested using the Read Enable (/REN) and RCLK. If, at the time of Master Reset, FWFT is HIGH, then FWFT mode will be selected. This mode uses Output Ready (/OR) to indicate whether or not there is valid data at the outputs (Qn) to be read. It also uses the Input Ready (/IR) signal to indicate whether or not the FIFO memory device 100 has any free space for writing. In the FWFT mode, the first word written to an empty FIFO goes directly to Qn after three RCLK rising edges and it is not necessary to set /REN LOW. Subsequent words must be accessed using the Read Enable (/REN) signal and RCLK. The FWFT mode can only be used when the device is configured in Single Data Rate (SDR) mode.

Write Clock (WCLK)

A write cycle is initiated on the rising and/or falling edge of the WCLK input. If the Write Single Data Rate (/WSDR) pin is selected, data will be written only on the rising edge of WCLK, provided that /WEN and /WCS are LOW. If the /WSDR is not selected, data will be written on both the rising and falling edges of WCLK, provided that /WEN and /WCS are LOW. Data setup and hold times must be met with respect to the LOW-to-HIGH transition of the WCLK. It is permissible to stop the WCLK. Note that while WCLK is idle, the /FF, /IR, and /PAF flags will not be updated. The write and read clocks can operate asynchronously relative to each other.

Write Enable (/WEN)

When the /WEN input is LOW, data may be loaded into the FIFO memory device 100 on the rising edge of every WCLK cycle if the device is not full. Data is stored in the memory device sequentially and independently of any ongoing read operation. When /WEN is HIGH, no new data may be written in the memory device. To prevent data overflow in the IDT Standard mode, /FF will go LOW, inhibiting further write operations. Upon completion of a valid read cycle, /FF will go HIGH, allowing a write to occur. The /FF is updated by two WCLK cycles+$t_{SKEW}$ after the RCLK cycle. To prevent data overflow in the FWFT mode, /IR will go HIGH, inhibiting further write operations. Upon the completion of a valid read cycle, /IR will go LOW, allowing a write to occur. The /IR flag is updated by two WCLK cycles+$t_{SKEW}$ after the valid RCLK cycle. /WEN is ignored when the FIFO is full in either IDT Standard mode or FWFT mode.

Write Signal Data Rate (IWSDR)

When the Write Single Data Rate signal is LOW, the write port will be set to Single Data Rate mode. In this mode, all write operations are based only on the rising edge of WCLK, provided that /WEN and /WCS are LOW. When /WSDR is HIGH, the read port will be set to Double Data Rate mode. In this mode, all write operations are based on both the rising and falling edge of WCLK, provided that /WEN and IWCS are LOW.

Read Clock (RCLK)

A read cycle is initiated on the rising and/or falling edge of the RCLK input. If the Read Single Data Rate (/RSDR) pin is selected, data will be read only on the rising edge of RCLK, provided that /REN and /RCS are LOW. If the /RSDR is not selected, data will be read on both the rising and falling edge of RCLK, provided that /REN and /RCS are LOW. Data setup and hold times must be met with respect to the LOW-to-HIGH transition of the RCLK. It is permissible to stop the RCLK. The /EF(/OR) and /PAE flags will not be updated while RCLK is idle.

Read Enable (/REN)

When Read Enable is LOW, data may be read from the memory device. When the /REN input is HIGH, the output register holds the previous data and no new data may be loaded into the output register. The data outputs Q0–Qn maintain the previous data. In IDT Standard mode, every word accessed at Qn, including the first word written to an empty FIFO, must be requested using /REN, provided that the Read Chip Select (/RCS) is LOW. When the last word has been read from the FIFO, the Empty Flag (/EF) will go LOW, inhibiting further read operations. /REN is ignored when the FIFO is empty. Once a write is performed, /EF will go HIGH allowing a read to occur. Both /RCS and /REN must be active LOW for data to be read out on the rising edge of RCLK. In FWFT mode, the first word written to an empty FIFO automatically goes to the outputs Qn on the third valid LOW-to-HIGH transition of RCLK+$t_{SKEW}$ after the first write. /REN and /RCS do not need to be asserted LOW for the first word to fall through to the output register. All subsequent words require that a read operation be executed using /REN and /RCS. The LOW-to-HIGH transition of RCLK after the last word has been read from the FIFO will make Output Ready (/OR) go HIGH and this will inhibit subsequent read operations.

Read Single Data Rate (/RSDR)

When the Read Single Data Rate pin is LOW, the read port will be set to Single Data Rate mode. In this mode, all read operations are based only on the rising edge of RCLK, provided that /REN and /RCS are LOW. When /RSDR is HIGH, the read port will be set to Double Data Rate mode. In this mode, all read operations are based on both the rising and falling edge of RCLK, provided that /REN and /RCS are LOW.

Serial Clock (SCLK)

The serial clock is used to load and read data in the programmable offset registers. Data from the Serial Input (SI) can be loaded into the offset registers on the rising edge of SCLK provided that /SEN is LOW. Data can be read from the offset registers via the Serial Output (SO) on the rising edge of SCLK provided that /SREN is LOW.

Serial Enable (/SEN)

The /SEN input is an enable signal used for serial programming of the programmable offset registers. It is used in conjunction with SI and SCLK when programming the offset registers. When /SEN is LOW, data at the Serial In (SI) input can be loaded into the offset register, one bit for each LOW-to-HIGH transition of SCLK. When /SEN is HIGH, the offset registers retain the previous settings and no offsets are loaded. /SEN functions the same way in both IDT Standard and FWFT modes.

Serial Read Enable (/SREN)

The /SREN output is an enable used for reading the value of the programmable offset registers. It is used in conjunction with SI and SCLK when reading from the offset registers. When /SREN is LOW, data can be read out of the offset register from the SO output, one bit for each LOW-to-HIGH transition of SCLK. When /SREN is HIGH, reading of the offset registers will stop. Whenever /SREN is activated, values in the offset registers are read starting from the first location in the offset registers and not from where the last offset value was read. /SREN functions the same way in both IDT Standard and FWFT modes.

Serial IN (SI)

This pin acts as a serial input for loading /PAE and /PAF offsets into the programmable offset registers. It is used in conjunction with the Serial Clock (SCLK) and the Serial Enable (/SEN). Data from this input can be loaded into the offset register, one bit for each LOW-to-HIGH transition of SCLK provided that /SEN is LOW.

Serial Out (SO)

This pin acts as a serial output for reading the values of the /PAE and /PAF offsets in the programmable offset registers. It is used in conjunction with the Serial Clock (SCLK) and the Serial Enable Output (/SREN). Data from the offset register can be read out using this pin, one-bit for each LOW-to-HIGH transition of SCLK provided that /SREN is LOW.

Output Enable (/OE)

When Output Enable is LOW, the parallel output buffers receive data from the output register. When /OE is HIGH, the output data bus (On) goes into a high-impedance state. During Master or Partial Reset, the /OE is the only input that can place the output data bus into high-impedance. During reset the /RCS input can be HIGH or LOW and has no effect on the output data bus.

Read Chip Select (/RCS)

The Read Chip Select input provides synchronous control of the Read output port. When /RCS goes LOW, the next rising edge of RCLK causes the On outputs to go to the low-impedance state. When /RCS goes HIGH, the next RCLK rising edge causes the On outputs to return to high-impedance. During a Master or Partial Reset, the /RCS input has no effect on the On output bus. /OE provides high-impedance control of the On outputs. If /OE is LOW, the On data outputs will be low-impedance regardless of /RCS until the first rising edge of RCLK after a reset is complete. Then, if /RCS is HIGH, the data outputs will go to high-impedance states. The /RCS input does not affect the operation of the flags. For example, when the first word is written to an empty FIFO, the /EF signal will still go from LOW to HIGH based on a rising edge of RCLK, regardless of the state of the /RCS input.

When operating the FIFO memory device 100 in FWFT mode, the first word written to an empty FIFO will be clocked through to the output register based on RCLK, regardless of the state of /RCS. If /RCS is HIGH when an empty FIFO is written into, the first word will fall through to the output register, but will not be available on the Qn outputs because they are in high-impedance states. The user must take /RCS active LOW to access this first word, placing the output bus in low-impedance. /REN should remain HIGH for at least one cycle after /RCS has gone LOW. A rising edge of RCLK with /RCS and /REN LOW will read out the next word. The /RCS pin must also be active (LOW) in order to perform a Retransmit.

Write Chip Select (/WCS)

The /NCS disables all Write Port inputs (data only) if it is held HIGH. To perform normal operations on the write port, the /WCS must be enabled.

HSTL Select (HSTL)

Many of the inputs or outputs can be setup to be either HSTL or LVTTL compatible. If HSTL is HIGH, the HSTL operation of those signals will be selected. If HSTL is LOW, then LVTTL will be selected. Configuring a FIFO memory device to support HSTL and LVTTL logic levels is more fully described at page 14 and Table 6 of the aforementioned U.S. Application Serial. No. 60/314,393.

Bus-Matching (BM, IW, OW)

The pins BM, IW, and OW are used to define the input and output bus widths. During Master Reset, the state of these pins is used to configure the device bus sizes, as illustrated by TABLE 5. All flags will operate on the word/byte size boundary as defined by the selection of bus width.

Flag Select Bits (FSEL0 and FSEL1)

These pins will select default offset values for the /PAE and /PAF flags during Master Reset. The status of these inputs should not change after Master Reset.

Data Out (Q0–Q39)

(Q0–Q39) are data outputs for 40-bit wide data, (Q0–Q19) are data outputs for 20-bit wide data, or (Q0–Q9) are data outputs for 10-bit wide data.

Full Flag (/FF(/IR))

This is a dual-purpose pin. In IDT Standard mode, the Full Flag (/FF) function is selected. When the FIFO is full, /FF will go LOW, inhibiting further write operations. When /FF is HIGH, the FIFO is not full.

In FWFT mode, the Input Ready (/IR) function is selected. /IR goes LOW when memory space is available for writing in data. When there is no longer any free space left, /IR goes HIGH, inhibiting further write operations. The /IR status not only measures the contents of the FIFO memory, but also counts the presence of a word in the output register. Thus, in FWFT mode, the total number of writes necessary to deassert /IR is one greater than needed to assert /FF in IDT Standard mode. /FF(/IR) is synchronous and updated on the rising edge of WCLK. /FF(/IR) are double register-buffered outputs.

When the FIFO device is in Retransmit mode, the full flag is determined based on a comparison of the write pointer to the "marked" location. This differs from normal mode where the full flag is determined based on a comparison of the write pointer to the read pointer.

Empty Flag (/EF(/OR))

This is a dual-purpose pin. In the IDT Standard mode, the Empty Flag (/EF) function is selected. When the FIFO is empty, /EF will go LOW, inhibiting further read operations. When /EF is HIGH, the FIFO is not empty. In FWFT mode, the Output Ready (/OR) function is selected. /OR goes LOW at the same time that the first word written to an empty FIFO appears valid on the outputs. /OR stays LOW after the RCLK LOW to HIGH transition that shifts the last word from the FIFO memory to the outputs. /OR goes HIGH only with a true read (RCLK with /REN=LOW). The previous data stays at the outputs, indicating the last word was read. Further data reads are inhibited until /OR goes LOW again. /EF(/OR) is synchronous and updated on the rising edge of RCLK. In IDT Standard mode, /EF is a double register-buffered output. In FWFT mode, /OR is a triple register-buffered output.

Programmable Almost-Full Flag (/PAF)

The Programmable Almost-Full flag (/PAF) will go LOW when the FIFO reaches the almost-full condition. The offset from the full condition, which defines the point at which the FIFO device is "almost" full, is programmable. When the FIFO memory device 100 is in Retransmit mode, the programmable almost full flag is determined based on a comparison of the write pointer to the "marked" location. This differs from normal mode where the almost full flag is determined based on a comparison of the write pointer to the read pointer.

Programmable Almost-Empty Flag (/PAE)

The Programmable Almost-Empty flag (/PAE) will go LOW when the FIFO device reaches the almost-empty condition. In the IDT Standard mode, /PAE will go LOW when there are n words or less in the FIFO. The offset "n" is the empty offset value. This empty offset value is maintained at a default value until overwritten by a programmable value.

Echo Read Clock (ERCLK)

Figure 4:
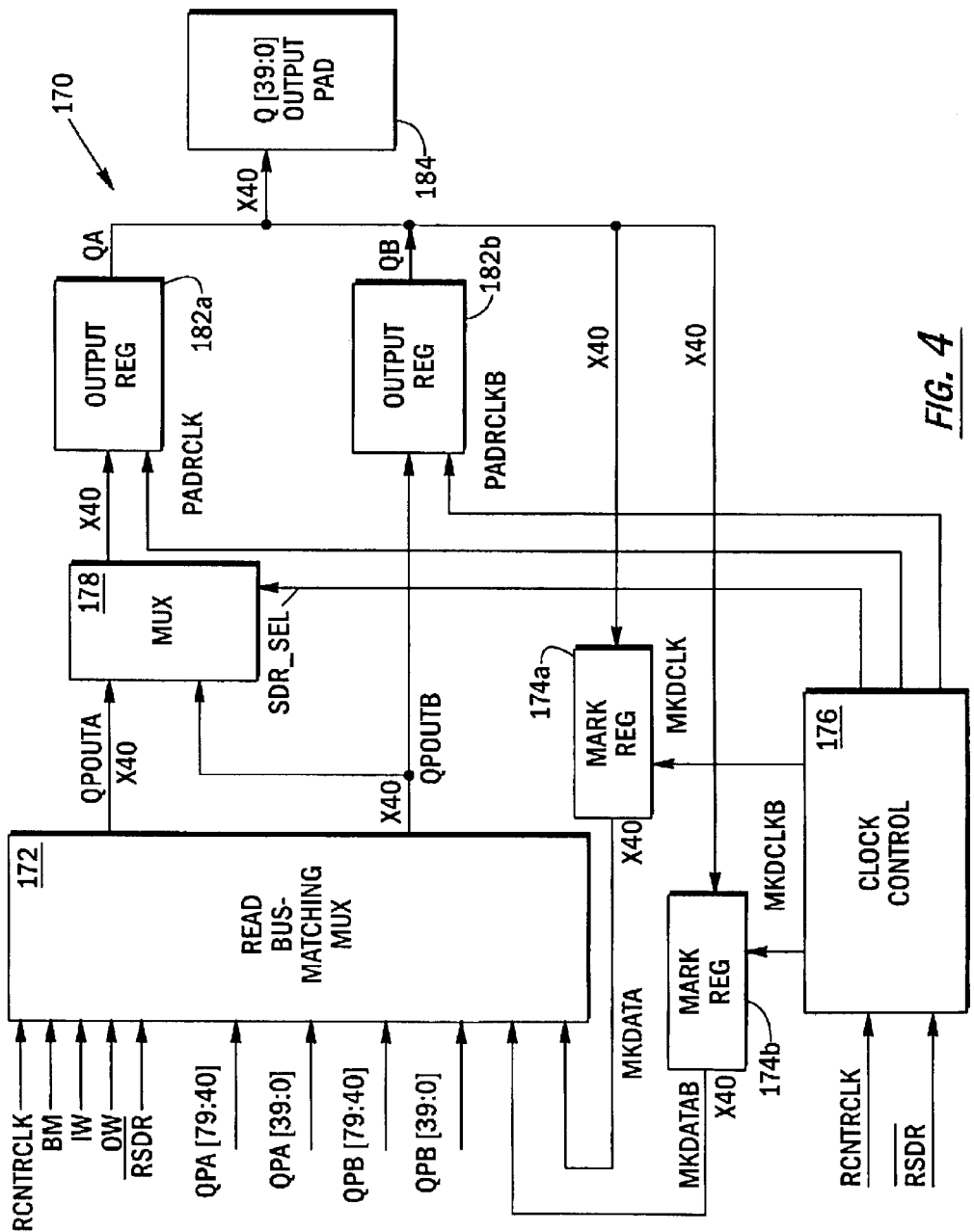
FIG. 4 is a block diagram illustrating features of a preferred data output multiplexer according to the FIFO memory device of FIG. 2.

The Echo Read Clock output is provided in both HSTL and LVTTL modes, selectable via HSTL. The ERCLK is a free-running clock output, and will always follow the RCLK input regardless of /REN and /RCS. The ERCLK output follows the RCLK input with an associated delay. This delay provides the user with a more effective read clock source when reading data from the Qn outputs. This is especially helpful at high speeds when variables within the device may cause changes in the data access times. These variations in access time may be caused by ambient temperature, supply voltage, or device characteristics. The ERCLK output also compensates for trace length delays between the Qn data outputs and receiving device inputs. Any variations affecting the data access time will also have a corresponding effect on the ERCLK output produced by the FIFO device. Therefore, the ERCLK output level transitions should always be at the same position in time relative to the data outputs. ERCLK is guaranteed by design to be slower than the slowest data output (Qn). FIGS. 4, 27 and 28 of the aforementioned U.S. Application Ser. No. 60/314,393 illustrate additional timing aspects related to the Echo Read Clock.

Echo Read Enable (/EREN)

The Echo Read Enable output is provided in both HSTL and LVTTL modes, selectable via HSTL. The /EREN output is provided to be used in conjunction with the ERCLK output and provides the reading device with a more effective scheme for reading data from the Qn output port at high speeds. A rising edge of RCLK will cause /EREN to go active (LOW) if both /REN and /RCS are active (LOW). /EREN is an ANDed function of /RCS and /REN. If the FIFO device is empty, /EREN will be held high.

Figure 2:
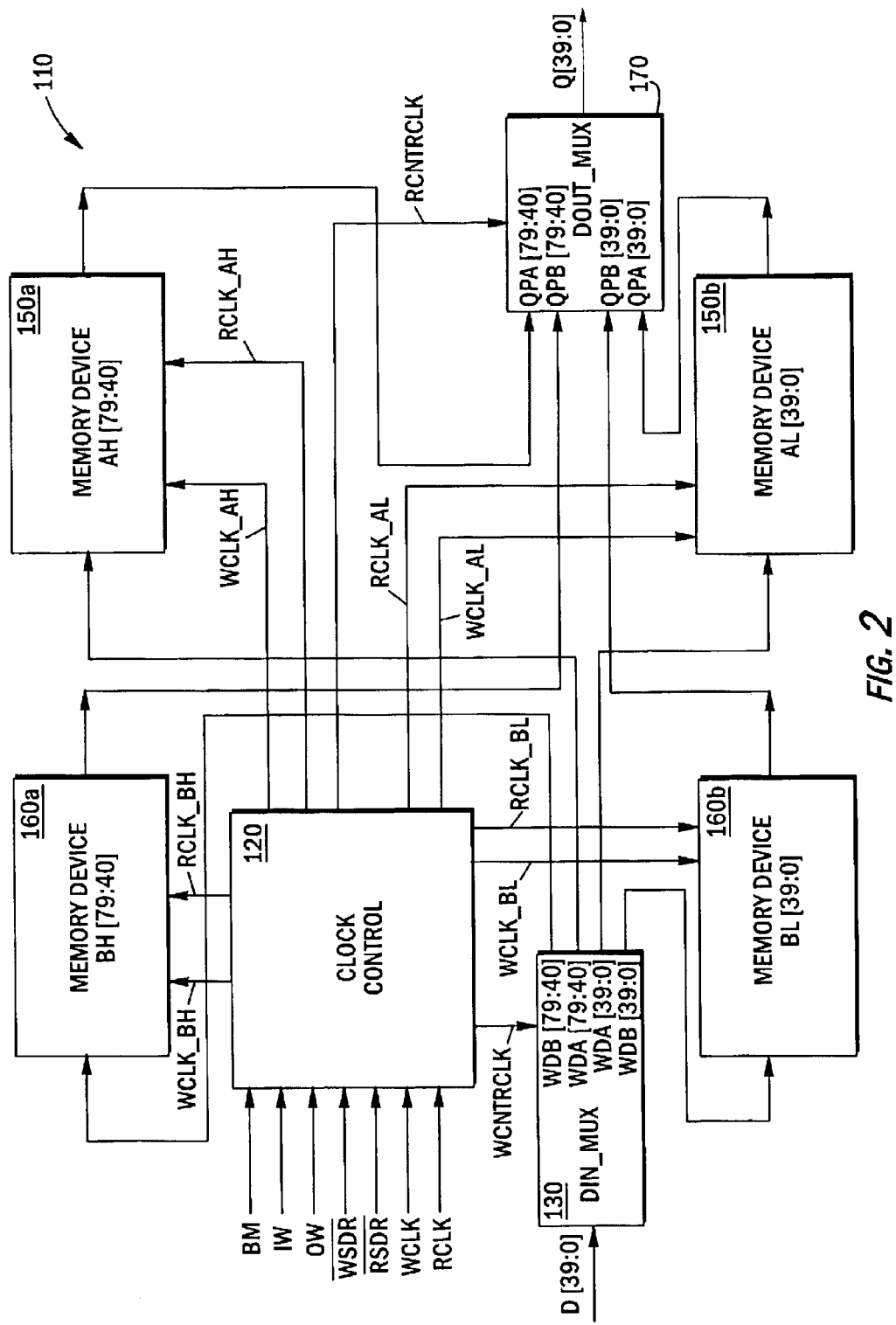
FIG. 2 is a block diagram of a FIFO memory device that utilizes a quad arrangement of memory devices therein, according to an embodiment of the present invention.

Referring now to FIG. 2, a block diagram of a FIFO memory device 110 according to another embodiment of the present invention will be described. In particular, FIG. 2 illustrates a data path of a FIFO memory device 110 that utilizes a preferred quad arrangement of memory devices therein. This quad arrangement of memory devices enables the FIFO memory device 110 to efficiently support any combination of DDR or SDR write modes with any combination of DDR or SDR read modes. The quad arrangement is illustrated as comprising a first pair of memory devices 150a and 150b, shown as AH and AL, and a second pair of memory devices 160a and 160b, shown as BH and BL. According to one preferred aspect of this embodiment, each of the memory devices AH, AL, BH and BL within the quad arrangement may constitute a quad-port cache memory device. Each quad-port cache memory device may have a data capacity of 1.31M SRAM cells (i.e., 1,310,720 SRAM cells). This data capacity for each quad-port cache may be achieved with four (4) blocks of memory cells, each having a capacity of 516×640 (512 rows+4 redundant rows), and two blocks of column redundancy memory (516×160 each).

Figure 3:
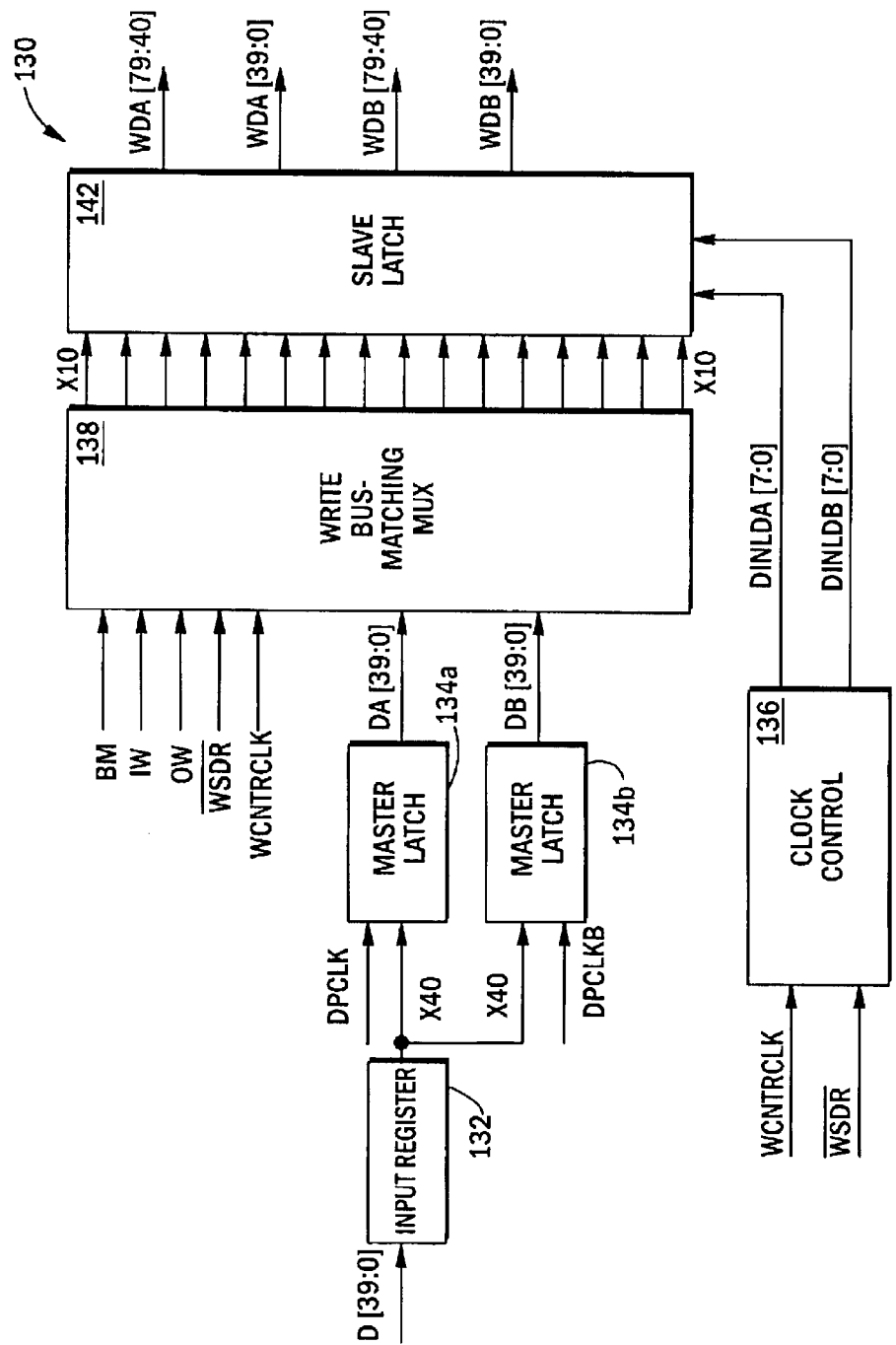
FIG. 3 is a block diagram illustrating features of a preferred data input multiplexer according to the FIFO memory device of FIG. 2.

Additional aspects of these preferred quad-port cache memory devices are more fully described in U.S. application Ser. No. 09/721,478, entitled "Integrated Circuit Memory Devices Having Multi-Port Cache Arrays Therein and Methods of Operating Same", filed Nov. 22, 2000, now U.S. Pat. No. 6,546,461, assigned to the present assignee, the disclosure of which is hereby incorporated herein by reference. Each of the four blocks of memory cells within a memory device (AH, AL, BH, BL) may be constructed as side-by-side pairs of the quad-port memory devices illustrated by FIGS. 1–4 of the '478 application, with each cache in each pair having a width of 160 bits (N=40). In particular, each memory device AH, AL, BH and BL may include four pairs of quad-port memory devices (e.g., QPCACHE0–7) coupled to four (4) blocks of 516×640 SRAM cells. These quad-port memory devices may include a data input register, a multiplexer and an output register. As illustrated by FIG. 3 of the '478 application, the data input register may have an input electrically coupled to a first port of the quad-port cache memory device and an output electrically coupled to a second port of the quad-port cache memory device. The multiplexer is responsive to at least one select signal and has a first input electrically coupled to the output of the data input register and a second input electrically coupled to a third port of the quad-port cache memory device. The output register has an input electrically coupled to an output of the multiplexer and an output electrically coupled to a fourth port of the quad-port cache memory device.

The FIFO memory device 110 of FIG. 2 also includes a clock control circuit 120 that is responsive to the read clock signal RCLK and write clock signal WCLK. These clock signals RCLK and WCLK may be free-running and typically represent externally generated clock signals. The clock control circuit 120 is also illustrated as being responsive to control signals BM (bus-matching), IW (input-width) and OW (output-width), the active low write single data rate signal (/WSDR) and the active low read single data rate signal (/RSDR). The function of these signals is more fully described above with respect to the FIFO memory device 100 of FIG. 1. The clock control circuit 120 generates read and write counter clock signals RCNTRCLK and WCNTRCLK as internal read and write clock signals that, when active, are in-sync with the read and write clock signals RCLK and WCLK, respectively. The read and write counter clock signals RCNTRCLK and WCNTRCLK are typically not free-running. The clock control circuit 120 also generates internal read and write clock signals that are provided to each of the pair of memory devices 150a, 150b and 160a, 160b in the quad arrangement. These internal read and write clock signals are illustrated as WCLK_AH, RCLK_AH, WCLK_AL, RCLK_AL, WCLK_BH, RCLK_BH and WCLK_BL, RCLK_BL. These internal read and write clock signals may be generated using read and write clock control circuits having multi-bit counters therein, such as those illustrated in the aforementioned U.S. Application Serial No. 60/314,393. However, other techniques for generating internal clock signals that do not require the use of counters may also be used. As illustrated and described more fully hereinbelow with respect to FIGS. 3–4, the data path of FIG. 2 also includes write control circuitry and read control circuitry. According to a preferred aspect of the data path, the write control circuitry and read control circuitry comprise an input multiplexer 130 (shown as DIN_MUX) and an output multiplexer 170 (shown as DOUT_MUX), respectively. Both the input and output multiplexers 130 and 170 perform bus matching functions and enable any combination of ×4N, ×2N and ×N data widths at the input port D0–Dn and output port Q0–Qn. These input and output multiplexers 130 and 170 are shown as being directly responsive to the write counter clock WCNTRCLK and read counter clock RCNTRCLK signals.

When the FIFO memory device 110 of FIG. 2 is disposed in a ×40 DDR write mode, the internal write clock signals WCLK_AH, WCLK_AL, WCLK_BH and WCLK_BL that are provided to the quad arrangement of memory devices 150a, 150b and 160a, 160b, respectively, will be generated in-sync with rising and falling edges of the write counter clock signal WCNTRCLK. In particular, each leading and trailing edge of two (2) consecutive cycles of the write counter clock signal WCNTRCLK will trigger a leading edge of a respective cycle of WCLK_AH, WCLK_AL, WCLK_BH and WCLK_BL. This aspect of the clock control circuit 120 is illustrated by TABLE 1, where the two consecutive cycles of the write counter clock signal WCNTRCLK are illustrated as WCLK1/2, /WCLK1/2, WCLK2/2 and /WCLK2/2. Alternatively, when the FIFO memory device 110 is disposed in a ×20 DDR write mode, the internal write clock signals WCLK_AH, WCLK_AL, WCLK_BH and WCLK_BL will be generated in-sync with consecutive trailing edges of the write counter clock signal WCNTRCLK. Thus, each trailing edge of four (4) consecutive cycles of the write counter clock signal WCNTRCLK will trigger a leading edge of a respective cycle of WCLK_AH, WCLK_AL, WCLK_BH and WCLK_BL. This aspect of the clock control circuit 120 is also illustrated by TABLE 1, where the trailing edges of the four consecutive cycles of the write counter clock signal WCNTRCLK are illustrated as /WCLK1/4, /WCLK2/4, /WCLK3/4 and /WCLK4/4. Furthermore, when the FIFO memory device 110 is disposed in a ×10 DDR write mode, the internal write clock signals WCLK_AH, WCLK_AL, WCLK_BH and WCLK_BL will be generated in-sync with trailing edges of every other cycle of the write counter clock signal WCNTRCLK. Thus, each trailing edge of every one of eight (8) consecutive cycles of the write counter clock signal WCNTRCLK will trigger a leading edge of a respective cycle of WCLK_AH, WCLK_AL, WCLK_BH and WCLK_BL. In TABLE 1, the trailing edges of every other one of eight consecutive cycles of the write counter clock signal WCNTRCLK are illustrated as /WCLK2/8, /WCLK4/8, /WCLK6/8 and /WCLK8/8.

TABLE 1

|  | DDR40 | DDR20 | DDR10 | SDR40 | SDR20 | SDR10 |
|---|---|---|---|---|---|---|
| WCLK_AH | WCLK1/2 | /WCLK1/4 | /WCLK2/8 | WCLK1/4 | WCLK2/8 | WCLK4/16 |
| WCLK_AL | /WCLK1/2 | /WCLK2/4 | /WCLK4/8 | WCLK2/4 | WCLK4/8 | WCLK8/16 |
| WCLK_BH | WCLK2/2 | /WCLK3/4 | /WCLK6/8 | WCLK3/4 | WCLK6/8 | WCLK12/16 |
| WCLK_BL | /WCLK2/2 | /WCLK4/4 | /WCLK8/8 | WCLK4/4 | WCLK8/8 | WCLK16/16 |

In contrast, when the FIFO memory device 110 is disposed in a ×40 SDR write mode, the internal write clock signals WCLK_AH, WCLK_AL, WCLK_BH and WCLK_BL will be generated in-sync with leading edges of four (4) consecutive cycles of the write counter clock signal WCNTRCLK. In TABLE 1, the leading edges of four consecutive cycles of the write counter clock signal WCNTRCLK are illustrated as WCLK1/4, WCLK2/4, WCLK3/4 and WCLK4/4. When the FIFO memory device 110 is disposed in a ×20 SDR write mode, the internal write clock signals WCLK_AH, WCLK_AL, WCLK_BH and WCLK_BL will be generated in-sync with leading edges of every other one of eight (8) consecutive cycles of the write counter clock signal WCNTRCLK. In TABLE 1, the leading edges of every other one of eight consecutive cycles of the write counter clock signal WCNTRCLK are illustrated as WCLK2/8, WCLK4/8, WCLK6/8 and WCLK8/8. Finally, when the FIFO memory device 110 is disposed in a ×10 SDR write mode, the internal write clock signals WCLK_AH, WCLK_AL, WCLK_BH and WCLK_BL will be generated in-sync with leading edges of every fourth one of sixteen (16) consecutive cycles of the write counter clock signal WCNTRCLK. In TABLE 1, the leading edges of every fourth one of sixteen consecutive cycles of the write counter clock signal WCNTRCLK are illustrated as WCLK4/16, WCLK8/16, WCLK12/16 and WCLK16/16.

The clock control circuit 120 also generates the internal read clock signals RCLK_AH, RCLK_AL, RCLK_BH and RCLK_BL from the read counter clock signal RCNTRCLK. As illustrated by TABLE 2, which is similar to TABLE 1, depending on the particular read mode (DDR or SDR) and read bus matching characteristics, the leading edges of each cycle of the internal read clock signals RCLK_AH, RCLK_AL, RCLK_BH and RCLK_BL may be generated off leading or trailing edges of particular cycles of the read counter clock signal RCNTRCLK.

130 also comprises an input register 132 that receives data from the input bus and a pair of master latches 134a and 134b having inputs that are coupled to an output of the input register 132. As illustrated, the master latches 134a and 134b are responsive to a first pair of complementary internal clock signals DPCLK and DPCLKB that are preferably generated from the external write clock signal WCLK. The first pair of complementary internal clock signals DPCLK and DPCLKB may have timing that is similar to (or the same as) the complementary write counter clock signals WCNTRCLK and WCNTRCLKB, respectively. In particular, up until the point the FIFO is full, the internal clock signals DPCLK and DPCLKB may have the same timing as the write counter clock signals WCNTRCLK and WCNTRCLKB and once the FIFO is full, the write counter clock signals WCNTRCLK and WCNTRCLKB are suspended while the internal clock signals DPCLK and DPCLKB continue to run. The outputs of the master latches 134a and 134b are electrically coupled to input ports DA[39:0] and DB[39:0] associated with write bus matching circuitry 138. The write bus matching circuitry 138 is also responsive to the write counter clock signal WCNTRCLK, the active low write single data rate signal IWSDR, and the bus matching control signals BM, IW and OW.

As illustrated by TABLE 3, the write bus matching circuitry 138 routes write data received at the pair of input ports DA[39:0] and DB[39:0] to a slave latch 142 that passes this write data to the plurality of output ports WDA[79:40], WDA[39:0], WDB[79:40] and WDB[39:0]. The slave latch 142 is responsive to a pair of multi-bit data input latch signals DINLDA[7:0] and DINLDB[7:0]. These data input latch signals may be generated by a clock control circuit 136 that is internal to the input multiplexer 130. This clock control circuit 136 is responsive to the write counter clock signal WCNTRCLK and the write single data rate signal /WSDR. The timing of the data input latch signals DINLDA

TABLE 2

|  | DDR40 | DDR20 | DDR10 | SDR40 | SDR20 | SDR10 |
|---|---|---|---|---|---|---|
| RCLK_AH | RCLK1/2 | /RCLK1/4 | /RCLK2/8 | RCLK1/4 | RCLK2/8 | RCLK4/16 |
| RCLK_AL | /RCLK1/2 | /RCLK2/4 | /RCLK4/8 | RCLK2/4 | RCLK4/8 | RCLK8/16 |
| RCLK_BH | RCLK2/2 | /RCLK3/4 | /RCLK6/8 | RCLK3/4 | RCLK6/8 | RCLK12/16 |
| RCLK_BL | /RCLK2/2 | /RCLK4/4 | /RCLK8/8 | RCLK4/4 | RCLK8/8 | RCLK16/16 |

The write control circuitry associated with the FIFO memory device 110 of FIG. 2 preferably includes an input multiplexer 130 that operates to route write data to each of the memory devices in the quad arrangement. As illustrated by FIG. 3, the input multiplexer 130 includes an input port that receives data from an input bus, shown as D[39:0], and a plurality of output ports. These output ports, which include WDA[79:40], WDA[39:0] and WDB[79:40], WDB[39:0], are coupled to the quad arrangement of memory devices 150a and 150b, shown as AH and AL, and memory devices 160a and 160b, shown as BH and BL. The input multiplexer

[7:0] and DINLDB[7:0], in response to the write counter clock signal WCNTRCLK and the write single data rate signal /WSDR, will be described more fully with respect to the timing diagrams of FIGS. 5 and 7.

The write bus matching circuitry 138 and the slave latch 142 collectively perform the bus matching operations illustrated by TABLES 3 and 4. In particular, these tables illustrate that during DDR40 write mode, 40 bits of data from the input port DA[39:0] will be written into memory device AH via output port WDA[79:40]. This writing operation will occur in-sync with a leading edge of a first of two consecutive cycles of the write counter clock signal WCNTRCLK (WCLK1/2). Following this, 40 bits of data from the input port DB[39:0] will be written into memory device AL via output port WDA[39:0]. This writing operation will occur in-sync with a trailing edge of the first of two cycles of the write counter clock signal WCNTRCLK (/WCLK1/2). Next, 40 bits of data from the input port DA[39:0] will be written into memory device BH via output port WDB[79:40]. This writing operation will occur in-sync with a leading edge of a second of the two consecutive cycles of the write counter clock signal WCNTRCLK (WCLK2/2). Finally, 40 bits of data from the input port DB[39:0] will be written into memory device BL via output port WDB[39:0]. This writing operation will occur in-sync with a trailing edge of a second of the two consecutive cycles of the write counter clock signal WCNTRCLK (/WCLK2/2). These tables also illustrate the bus matching and write timing associated with all other combinations of write modes. In particular, TABLE 3 indicates that during any combination of single data rate write mode, only the first port DA[39:0] of the two input ports to the write bus matching circuitry 138 will be utilized.

data ports QPA[79:40], QPA[39:0], QPB[79:40] and QPB[39:0] that receive read data from the memory devices AH, AL, BH and BL within the quad arrangement. The bus matching circuitry 172 is also responsive to the read counter clock RCNTRCLK, the bus matching control signals BM, IW and OW and the active low read signal data rate signal /RSDR. As illustrated by TABLE 5, the binary value of the bus matching control signals establish the routing configuration of the input and output multiplexers 130 and 170.

TABLE 5

| BM | IW | OW | Write Port Width | Read Port Width |
|----|----|----|-------------------|------------------|
| L  | L  | L  | ×40               | ×40              |
| H  | L  | L  | ×40               | ×20              |
| H  | L  | H  | ×40               | ×10              |
| H  | H  | L  | ×20               | ×40              |
| H  | H  | H  | ×10               | ×40              |

The read bus matching circuitry 172 also has input data ports that receive a unit of marked read data (MKDATA, MKDATAB) from a pair of mark registers 174a and 174b when the FIFO memory device 110 is disposed in a retrans-

TABLE 3

| OUTPUT PORT | | DDR40 | DDR20 | DDR10 | SDR40 | SDR20 | SDR10 |
|---|---|---|---|---|---|---|---|
| AH | WDA[79:70] | DA[39:30] | DA[19:10] | DA[9:0] | DA[39:30] | DA[19:10] | DA[9:0] |
|    | WDA[69:60] | DA[29:20] | DA[9:0]   | DB[9:0] | DA[29:20] | DA[9:0]   | DA[9:0] |
|    | WDA[59:50] | DA[19:10] | DB[19:10] | DA[9:0] | DA[19:10] | DA[19:10] | DA[9:0] |
|    | WDA[49:40] | DA[9:0]   | DB[9:0]   | DB[9:0] | DA[9:0]   | DA[9:0]   | DA[9:0] |
| AL | WDA[39:30] | DB[39:30] | DA[19:10] | DA[9:0] | DA[39:30] | DA[19:10] | DA[9:0] |
|    | WDA[29:20] | DB[29:20] | DA[9:0]   | DB[9:0] | DA[29:20] | DA[9:0]   | DA[9:0] |
|    | WDA[19:10] | DB[19:10] | DB[19:10] | DA[9:0] | DA[19:10] | DA[19:0]  | DA[9:0] |
|    | WDA[9:0]   | DB[9:0]   | DB[9:0]   | DB[9:0] | DA[9:0]   | DA[9:0]   | DA[9:0] |
| BH | WDB[79:70] | DA[39:30] | DA[19:10] | DA[9:0] | DA[39:30] | DA[19:10] | DA[9:0] |
|    | WDB[69:60] | DA[29:20] | DA[9:0]   | DB[9:0] | DA[29:20] | DA[9:0]   | DA[9:0] |
|    | WDB[59:50] | DA[19:10] | DB[19:10] | DA[9:0] | DA[19:10] | DA[19:10] | DA[9:0] |
|    | WDB[49:40] | DA[9:0]   | DB[9:0]   | DB[9:0] | DA[9:0]   | DA[9:0]   | DA[9:0] |
| BL | WDB[39:30] | DB[39:30] | DA[19:10] | DA[9:0] | DA[39:30] | DA[19:10] | DA[9:0] |
|    | WDB[29:20] | DB[29:20] | DA[9:0]   | DB[9:0] | DA[29:20] | DA[9:0]   | DA[9:0] |
|    | WDB[19:10] | DB[19:10] | DB[19:10] | DA[9:0] | DA[19:10] | DA[19:10] | DA[9:0] |
|    | WDB[9:0]   | DB[9:0]   | DB[9:0]   | DB[9:0] | DA[9:0]   | DA[9:0]   | DA[9:0] |

TABLE 4

| OUTPUT PORT | | DDR40 | DDR20 | DDR10 | SDR40 | SDR20 | SDR10 |
|---|---|---|---|---|---|---|---|
| AH | WDA[79:70] | WCLK1/2  | WCLK1/4  | WCLK1/8  | WCLK1/4 | WCLK1/8 | WCLK1/16 |
|    | WDA[69:60] | WCLK1/2  | WCLK1/4  | /WCLK1/8 | WCLK1/4 | WCLK1/8 | WCLK2/16 |
|    | WDA[59:50] | WCLK1/2  | /WCLK1/4 | WCLK2/8  | WCLK1/4 | WCLK2/8 | WCLK3/16 |
|    | WDA[49:40] | WCLK1/2  | /WCLK1/4 | /WCLK2/8 | WCLK1/4 | WCLK2/8 | WCLK4/16 |
| AL | WDA[39:30] | /WCLK1/2 | WCLK2/4  | WCLK3/8  | WCLK2/4 | WCLK3/8 | WCLK5/16 |
|    | WDA[29:20] | /WCLK1/2 | WCLK2/4  | /WCLK3/8 | WCLK2/4 | WCLK3/8 | WCLK6/16 |
|    | WDA[19:10] | /WCLK1/2 | /WCLK2/4 | WCLK4/8  | WCLK2/4 | WCLK4/8 | WCLK7/16 |
|    | WDA[9:0]   | /WCLK1/2 | /WCLK2/4 | /WCLK4/8 | WCLK2/4 | WCLK4/8 | WCLK8/16 |
| BH | WDB[79:70] | WCLK2/2  | WCLK3/4  | WCLK5/8  | WCLK3/4 | WCLK5/8 | WCLK9/16 |
|    | WDB[69:60] | WCLK2/2  | WCLK3/4  | /WCLK5/8 | WCLK3/4 | WCLK5/8 | WCLK10/16 |
|    | WDB[59:50] | WCLK2/2  | /WCLK3/4 | WCLK6/8  | WCLK3/4 | WCLK6/8 | WCLK11/16 |
|    | WDB[49:40] | WCLK2/2  | /WCLK3/4 | /WCLK6/8 | WCLK3/4 | WCLK6/8 | WCLK12/16 |
| BL | WDB[39:30] | /WCLK2/2 | WCLK4/4  | WCLK7/8  | WCLK4/4 | WCLK7/8 | WCLK13/16 |
|    | WDB[29:20] | /WCLK2/2 | WCLK4/4  | /WCLK7/8 | WCLK4/4 | WCLK7/8 | WCLK14/16 |
|    | WDB[19:10] | /WCLK2/2 | /WCLK4/4 | WCLK8/8  | WCLK4/4 | WCLK8/8 | WCLK15/16 |
|    | WDB[9:0]   | /WCLK2/2 | /WCLK4/4 | /WCLK8/8 | WCLK4/4 | WCLK8/8 | WCLK16/16 |

The read control circuitry associated with the FIFO memory device 110 of FIG. 2 preferably includes an output multiplexer 170 that operates to route read data received from each of the memory devices in the quad arrangement. As illustrated by FIG. 4, the output multiplexer 170 includes read bus matching circuitry 172 having a plurality of input mit from mark (RTM) DDR read mode. As illustrated, these mark registers 174a and 174b are responsive to a pair of mark data clock signals MKDCLK and MKDCLKB that may be derived from the read counter clock signal RCNTRCLK. The timing of these mark data clock signals MKDCLK and MKDCLKB during normal read operations is more fully illustrated by the timing diagrams of FIGS. 6A–6B.

The output ports QPOUTA and QPOUTB of the read bus matching circuitry 172 are coupled to respective first and second output registers 182a and 182b. These output registers 182a and 182b have outputs that are electrically coupled to output pins Q[39:0] of the FIFO memory device 110, shown as output pad 184. The outputs of the first and second output registers 182a and 182b are also fed back to the inputs of the mark registers 174a and 174b so that these mark registers always retain the currently available read data. However, in response to an active mark signal MARK during a ×40, ×20 or ×10 DDR read mode, the unit of marked read data is fed from the first and second output registers 182a and 182b to the mark registers 174a and 174b and held until a retransmit request is received. During SDR read mode, only one of the pair of mark registers is active. As illustrated and described more fully hereinbelow with respect to the timing diagram of FIGS. 6A-6B, the mark data clock signals MKDCLK and MKDCLKB are suspended once an active mark request has been received in order to prevent the marked data from being overwritten by subsequent read data on the next cycle of the read clock signal RCLK.

Referring still to the output multiplexer 170 of FIG. 4, a redirect multiplexer 178 is provided to redirect the output port QPOUTB of the read bus matching circuitry 172 to the first output register 182a, when the FIFO memory device 110 is disposed in an SDR read mode and the second output register 182b is held inactive. The first and second output registers 182a and 182b are responsive to a pair of pad read clock signals PADRCLK and PADRCLKB. The timing of these pad read clock signals is more fully-illustrated by FIGS. 6A-6B and 8. The mark data clock signals MKDCLK and MKDCLKB, the pad read clock signals PADRCLK and PADRCLKB and the single data rate select signal SDR_SEL are generated by a clock control circuit 176. This clock control circuit is responsive to the read counter clock signal RCNTRCLK and the active low read single data rate signal /RSDR. The binary value of the single data rate select signal SDR_SEL can be used to control whether the output port QPOUTA or QPOUTB is directed to the first output register 182a when the FIFO memory device 170 is disposed in the SDR read mode.

As illustrated by TABLES 6 and 7, during the DDR read mode, read data from the memory device AH, which is received at the input port QPA[79:40] of the read bus matching circuitry 172, passes to the output port QPOUTA, and is latched in the first output register 182a in-sync with a leading edge of a first of two consecutive cycles of the read counter clock signal RCNTRCLK. During the next half cycle of the read counter clock signal RCNTRCLK, read data from the memory device AL, which is received at the input port QPA[39:0] of the read bus matching circuitry 172 and passes to the output port QPOUTB, is latched in the second output register 182b in-sync with a trailing edge of the first of two consecutive cycles of the read counter clock signal RCNTRCLK. During the second cycle of the read counter clock signal RCNTRCLK, read data from the memory device BH, which is received at the input port QPB[79:40] and passes to the output port QPOUTA, is latched in the first output register 182a in-sync with a leading edge of a second of two consecutive cycles of the read counter clock signal RCNTRCLK. Finally, during the second half of the second cycle, read data from the memory device BL, which is received at the input port QPB[39:0] and passes to the output port QPOUTB, is latched in the second output register 182b in-sync with a trailing edge of the second of two consecutive cycles of the read clock signal RCNTRCLK. TABLES 6 and 7 also illustrate timing and bus matching for all other read mode operations. During SDR read mode, all data provided to the output port QPOUTB is routed through the redirect multiplexer 178 to the first output register 182a and the second output register 182b is held inactive (PADRCLKB is held low).

TABLE 6

| INPUT PORT | | DDR40 | DDR20 | DDR10 | SDR40 | SDR20 | SDR10 |
|---|---|---|---|---|---|---|---|
| AH | QPA[79:70] | QPOUTA[39:30] | QPOUTA[19:10] | QPOUTA[9:0] | QPOUTA[39:30] | QPOUTA[19:10] | QPOUTA[9:0] |
|  | QPA[69:60] | QPOUTA[29:20] | QPOUTA[9:0] | QPOUTB[9:0] | QPOUTA[29:20] | QPOUTA[9:0] | QPOUTB[9:0] |
|  | QPA[59:50] | QPOUTA[19:10] | QPOUTB[19:10] | QPOUTA[9:0] | QPOUTA[19:10] | QPOUTB[19:10] | QPOUTA[9:0] |
|  | QPA[49:40] | QPOUTA[9:0] | QPOUTB[9:0] | QPOUTB[9:0] | QPOUTA[9:0] | QPOUTB[9:0] | QPOUTB[9:0] |
| AL | QPA[39:30] | QPOUTB[39:30] | QPOUTA[19:10] | QPOUTA[9:0] | QPOUTB[39:30] | QPOUTA[19:10] | QPOUTA[9:0] |
|  | QPA[29:20] | QPOUTB[29:20] | QPOUTA[9:0] | QPOUTB[9:0] | QPOUTB[29:20] | QPOUTA[9:0] | QPOUTB[9:0] |
|  | QPA[19:10] | QPOUTB[19:0] | QPOUTB[19:10] | QPOUTA[9:0] | QPOUTB[19:10] | QPOUTB[19:0] | QPOUTA[9:0] |
|  | QPA[9:0] | QPOUTB[9:0] | QPOUTB[9:0] | QPOUTB[9:0] | QPOUTB[9:0] | QPOUTB[9:0] | QPOUTB[9:0] |
| BH | QPB[79:70] | QPOUTA[39:30] | QPOUTA[19:10] | QPOUTA[9:0] | QPOUTA[39:30] | QPOUTA[19:10] | QPOUTA[9:0] |
|  | QPB[69:60] | QPOUTA[29:20] | QPOUTA[9:0] | QPOUTB[9:0] | QPOUTA[29:20] | QPOUTA[9:0] | QPOUTB[9:0] |
|  | QPB[59:50] | QPOUTA[19:10] | QPOUTB[19:10] | QPOUTA[9:0] | OPOUTA[19:10] | QPOUTB[19:10] | QPOUTA[9:0] |
|  | QPB[49:40] | QPOUTA[9:0] | QPOUTB[19:0] | QPOUTB[9:0] | QPOUTA[9:0] | QPOUTB[9:0] | QPOUTB[9:0] |
| BL | QPB[39:30] | QPOUTB[39:30] | QPOUTA[19:10] | QPOUTA[9:0] | QPOUTB[39:30] | QPOUTA[19:10] | QPOUTA[9:0] |
|  | QPB[29:20] | QPOUTB[29:20] | QPOUTA[9:0] | QPOUTB[9:0] | QPOUTB[29:20] | QPOUTA[9:0] | QPOUTB[9:0] |
|  | QPB[19:10] | QPOUTB[19:10] | QPOUTB[19:10] | QPOUTA[9:0] | QPOUTB[19:10] | QPOUTB[19:10] | QPOUTA[9:0] |
|  | QPB[9:0] | QPOUTB[9:0] | QPOUTB[9:0] | QPOUTB[9:0] | QPOUTB[9:0] | QPOUTB[9:0] | QPOUTB[9:0] |

TABLE 7

| OUTPUT PORT | | DDR40 | DDR20 | DDR10 | SDR40 | SDR20 | SDR10 |
|---|---|---|---|---|---|---|---|
| AH | QPA[79:70] | RCLK1/2 | RCLK1/4 | RCLK1/8 | RCLK1/4 | RCLK1/8 | RCLK1/16 |
|  | QPA[69:60] | RCLK1/2 | RCLK1/4 | /RCLK1/8 | RCLK1/4 | RCLK1/8 | RCLK2/16 |
|  | QPA[59:50] | RCLK1/2 | /RCLK1/4 | RCLK2/8 | RCLK1/4 | RCLK2/8 | RCLK3/16 |
|  | QPA[49:40] | RCLK1/2 | /RCLK1/4 | /RCLK2/8 | RCLK1/4 | RCLK2/8 | RCLK4/16 |

TABLE 7-continued

| OUTPUT PORT | | DDR40 | DDR20 | DDR10 | SDR40 | SDR20 | SDR10 |
|---|---|---|---|---|---|---|---|
| AL | QPA[39:30] | /RCLK1/2 | RCLK2/4 | RCLK3/8 | RCLK2/4 | RCLK3/8 | RCLK5/16 |
|  | QPA[29:20] | /RCLK1/2 | RCLK2/4 | /RCLK3/8 | RCLK2/4 | RCLK3/8 | RCLK6/16 |
|  | QPA[19:10] | /RCLK1/2 | /RCLK2/4 | RCLK4/8 | RCLK2/4 | RCLK4/8 | RCLK7/16 |
|  | QPA[9:0] | /RCLK1/2 | /RCLK2/4 | /RCLK4/8 | RCLK2/4 | RCLK4/8 | RCLK8/16 |
| BH | QPB[79:70] | RCLK2/2 | RCLK3/4 | RCLK5/8 | RCLK3/4 | RCLK5/8 | RCLK9/16 |
|  | QPB[69:60] | RCLK2/2 | RCLK3/4 | /RCLK5/B | RCLK3/4 | RCLK5/8 | RCLK10/16 |
|  | QPB[59:50] | RCLK2/2 | /RCLK3/4 | RCLK6/8 | RCLK3/4 | RCLK6/8 | RCLK11/16 |
|  | QPB[49:40] | RCLK2/2 | /RCLK3/4 | /RCLK6/8 | RCLK3/4 | RCLK6/8 | RCLK12/16 |
| BL | QPB[39:30] | /RCLK2/2 | RCLK4/4 | RCLK7/8 | RCLK4/4 | RCLK7/8 | RCLK13/16 |
|  | QPB[29:20] | /RCLK2/2 | RCLK4/4 | /RCLK7/8 | RCLK4/4 | RCLK7/8 | RCLK14/16 |
|  | QPB[19:10] | /RCLK2/2 | /RCLK4/4 | RCLK8/8 | RCLK4/4 | RCLK8/8 | RCLK15/16 |
|  | QPB[9:0] | /RCLK2/2 | /RCLK4/4 | /RCLK8/8 | RCLK4/4 | RCLK8/8 | RCLK16/16 |

Figure 5:
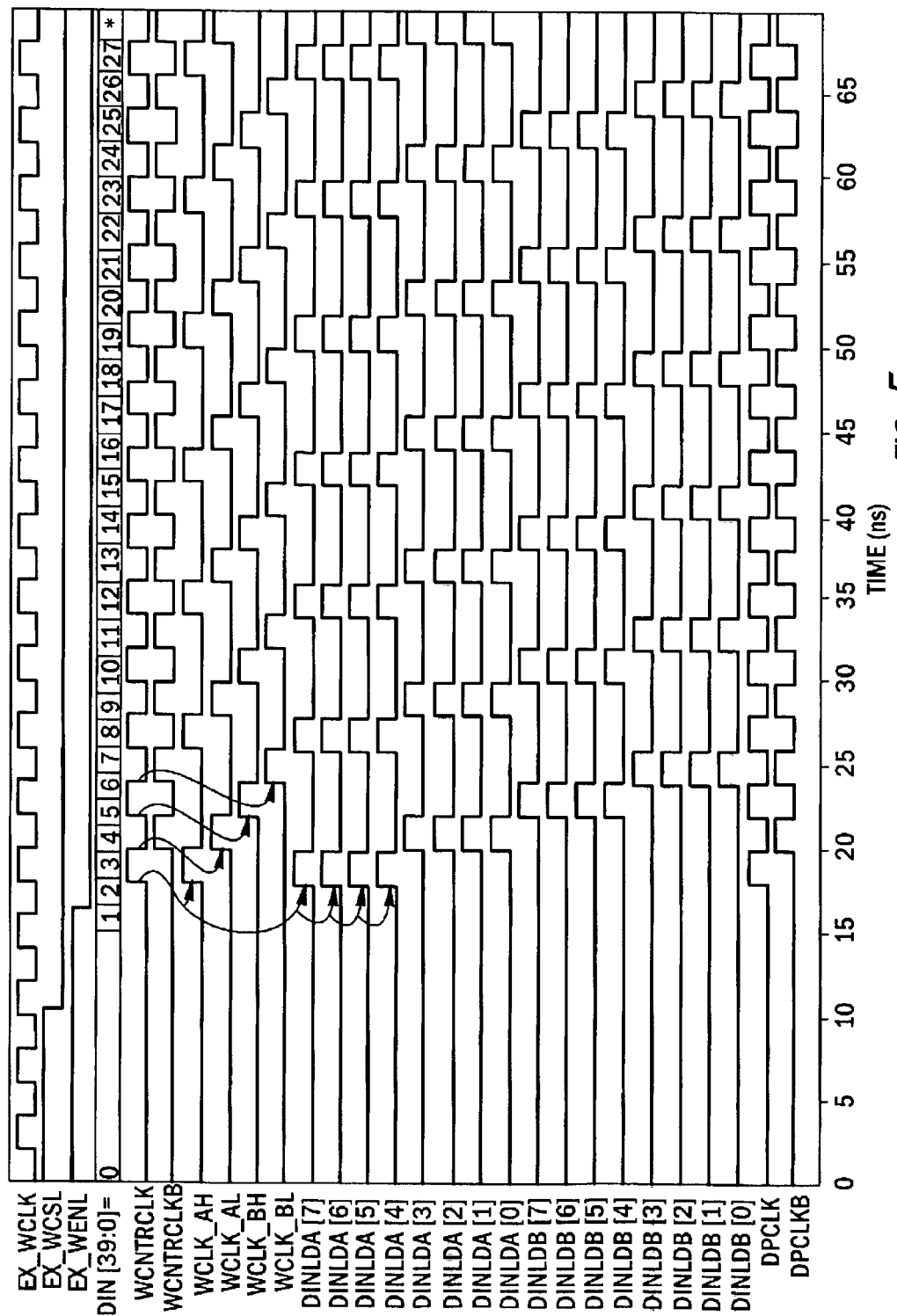
FIG. 5 is a timing diagram that illustrates operations performed by the FIFO memory device of FIG. 2 when the memory device is configured in a x40 dual data rate (DDR) write mode of operation.

Referring now to the timing diagram of FIG. 5, ×40 DDR write operations may commence by setting the external active low write chip select EX_WCSL (/WCS) LOW and then setting the external active low write enable signal EX_WENL (/WEN) LOW. As described above, the receipt of a free-running external write clock signal EX_WCLK can be used to generate true and complementary internal write counter clock signals WCNTRCLK and WCNTR-CLKB that control, among other things, the timing of write operations within the FIFO memory devices 100 and 110. As illustrated, the leading (e.g., rising) edge of every other cycle of the internal write counter clock signal WCNTRCLK triggers a leading edge of the write clock signal associated with memory device AH (WCLK_AH). The trailing (e.g., falling) edge of every other cycle of the internal write counter clock signal WCNTRCLK triggers a leading edge of the write clock signal associated with memory device AL (WCLK-AL). Write clock signals WCLK_BH and WCLK_BL are also generated in a similar manner.

The leading edge of the internal write counter clock signal WCNTRCLK that triggered a leading edge of write clock signal WCLK_AH also triggers the leading edges of four data input latch signals DINLDA[7:4]. This operation to generate the data input latch signals is performed by the clock control circuit 136 illustrated by FIG. 3. These data input latch signals DINLDA[7:4] cause the slave latch 142 to latch four sets of ×10 data and provide this write data to the memory device AH via the output port WDA[79:40] of the slave latch 142. This write data is illustrated as DIN [39:0]. The trailing edge of the internal write counter clock signal WCNTRCLK that triggered a leading edge of write clock signal WCLK_AL also triggers the leading edges of another four data input latch signals DINLDA[3:0]. These data input latch signals DINLDA[3:0] cause the slave latch 142 to latch four sets of ×10 data and provide this data to the memory device AL via the output port WDA[39:0] of the slave latch 142. Similarly, the leading edges of WCLK_BH and WCLK_BL trigger the generation of active data input latch signals DINLDB[7:4] and DINLDB[3:0], respectively.

Figure 6A:
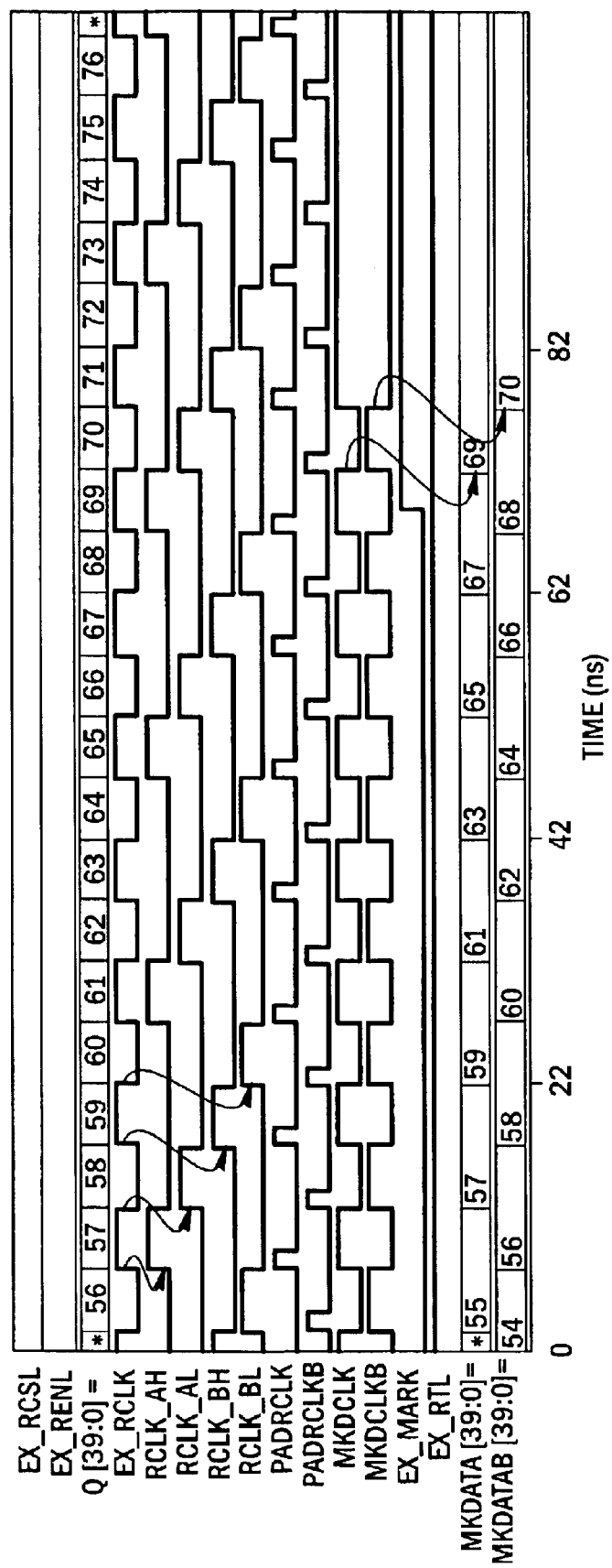
FIG. 6A is a timing diagram that illustrates operations performed by the FIFO memory device of FIG. 2 when the memory device is configured in a x40 dual data rate (DDR) read mode of operation.
Figure 6B:
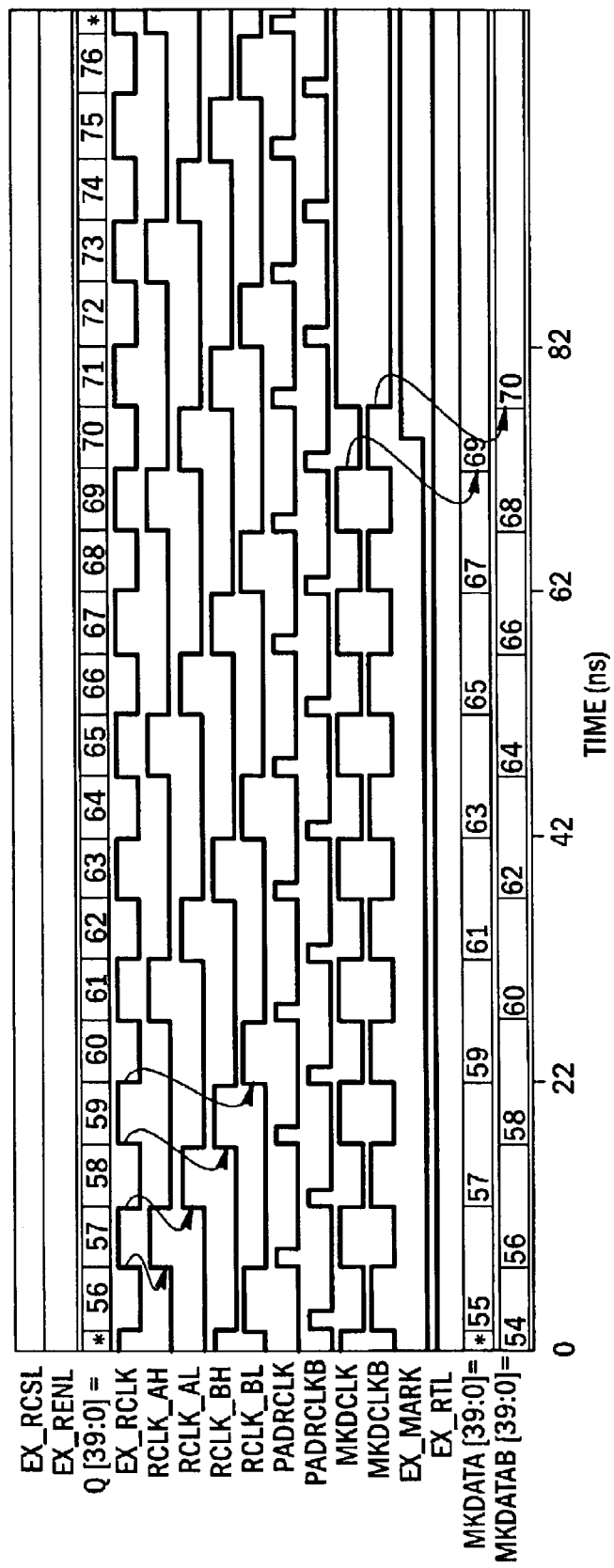
FIG. 6B is another timing diagram that illustrates operations performed by the FIFO memory device of FIG. 2 when the memory device is configured in a x40 dual data rate (DDR) read mode of operation.

Referring now to the timing diagram of FIGS. 6A–6B, ×40 DDR read operations may commence by setting the external active low read chip select EX_RCSL (/RCS) LOW and setting the external active low read enable signal EX_RENL (/REN) LOW. The receipt of a free-running external read clock signal EX_RCLK can be used to generate true and complementary internal read counter clock signals RCNTRCLK and RCNTRCLKB (not shown) that control, among other things, the timing of read operations within the FIFO memory devices 100 and 110. As illustrated, the leading (e.g., rising) edge of every other cycle of the external read clock signal EX_RCLK triggers a leading edge of the internal read counter clock signal RCNTRCLK, which in turn triggers the leading edge of the read clock signal associated with memory device AH (RCLK_AH). The trailing (e.g., falling) edge of every other cycle of the external read clock signal EX_RCLK indirectly triggers a leading edge of the read clock signal associated with memory device AL (RCLK_AL). Read clock signals RCLK_BH and RCLK_BL are also generated in a similar manner.

The clock control circuit 176 illustrated by FIG. 4 also generates a first pulse train as an active high pad read clock signals PADRCLK in-sync with leading edges of the external read clock signal EX_RCLK and a second pulse train of complementary active high pad read clock signals PADRCLKB in-sync with trailing edges of the external read clock signal EX_RCLK. These pad read clock signals operate to latch read data into the first and second output registers 182a and 182b. The latching of this read data results in an output data Q[39:0] stream that changes in response to each leading and trailing edge of the external read clock signal EX_RCLK. The clock control circuit 176 also operates to generate a pair of complementary mark data clock signals MKDCLK and MKDCLKB, which are provided to separate mark registers 174a and 174b. These mark data clock signals operate to latch a unit (i.e., pairs) of marked read data MKDATA[39:0] and MKDATAB[39:0] into the mark registers.

The timing diagrams of FIGS. 6A-6B also illustrate the external active high mark signal EX_MARK and the external active low retransmit signal EX_RTL (/RT). In particular, as illustrated by FIG. 6A, the rising edge of the mark signal EX_MARK shortly after the rising edge of a cycle of EX_RCLK that resulted in the latching of read data Q[39:0]=69 into the first output register 182a, will trigger the latching of that same data Q[39:0]=69 into the first mark register 174a followed by the latching of the following data Q[39:0]=70 into the second mark register 174b. Thereafter, while the external mark signal EX_MARK remains high, no subsequent read data is provided to the mark registers. This enables the mark registers to immediately provide the first marked unit of read data to the output Q[39:0] (via the read bus matching circuitry 172) in response to an active low retransmit signal /RT. While the first marked unit data is being provided without delay, the read pointer within the FIFO memory device can be reset to the next read location following the marked location and then the above described read operations can proceed to read subsequent entries. Similarly, as illustrated by the timing diagram of FIG. 6B, the rising edge of the mark signal EX_MARK shortly after the falling edge of a cycle of EX_RCLK that resulted in the latching of read data Q[39:0]=70 into the second output register 182b, will trigger the latching of that same data Q[39:0]=70 into the second mark register 174b. Thereafter, while the external mark signal EX_MARK remains high, no subsequent read data is provided to the mark registers.

A combination of read control circuitry provided in part by the clock control circuit 176 and components of the output multiplexer 170 may be used to mark data read from the FIFO memory device 110 in response to a trailing edge of a first cycle of an internal read clock signal during the DDR read mode. The retransmit operations performed by this circuitry may include retransmitting data in pairs by commencing the retransmission with data previously read from the FIFO memory device in response to a leading edge of the first cycle of the read clock signal before following with the marked read data that was originally read on the trailing edge of the first cycle of the read clock signal.

Figure 7:
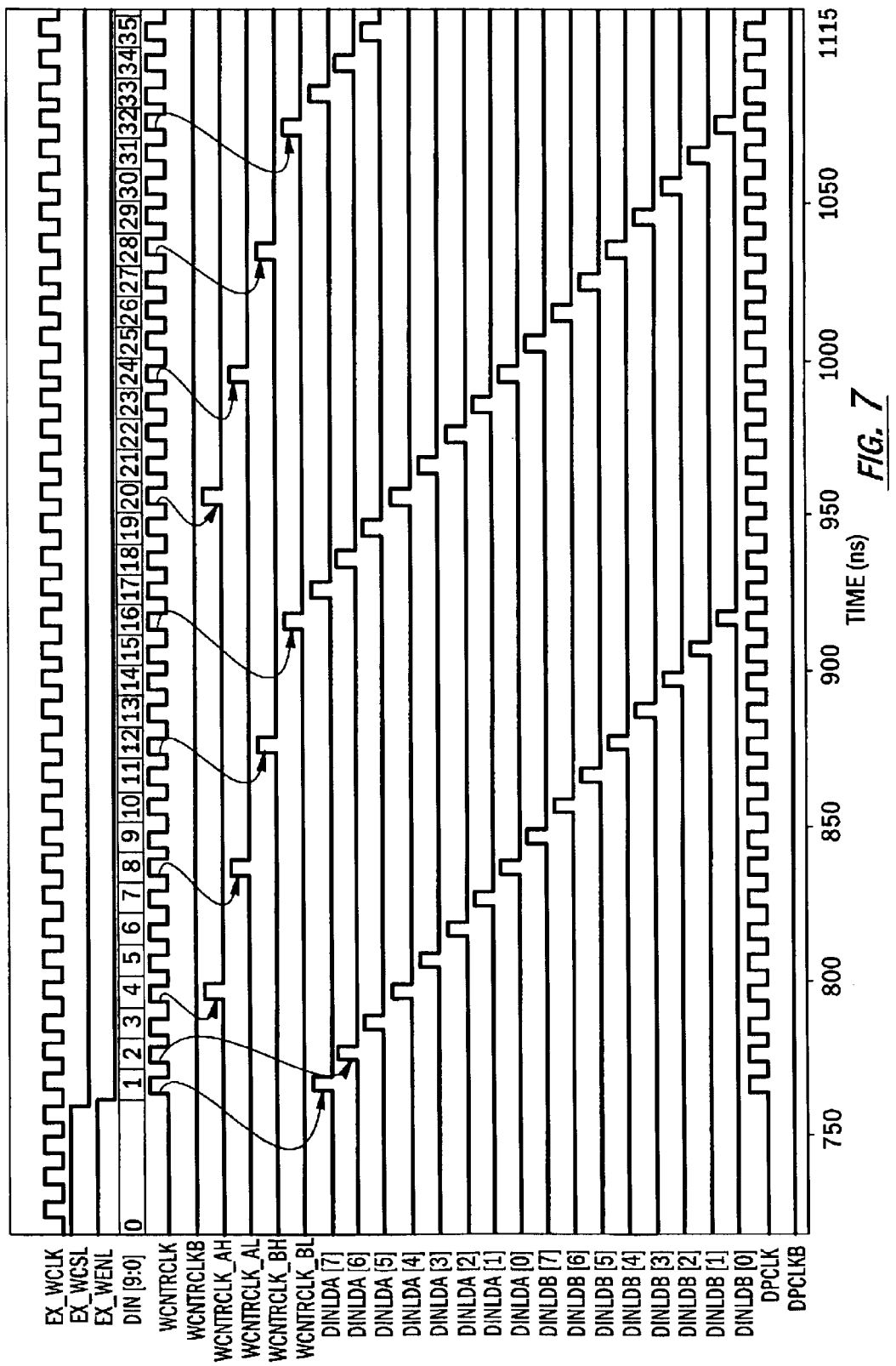
FIG. 7 is a timing diagram that illustrates operations performed by the FIFO memory device of FIG. 2 when the memory device is configured in a x10 single data rate (SDR) write mode of operation.
Figure 8:
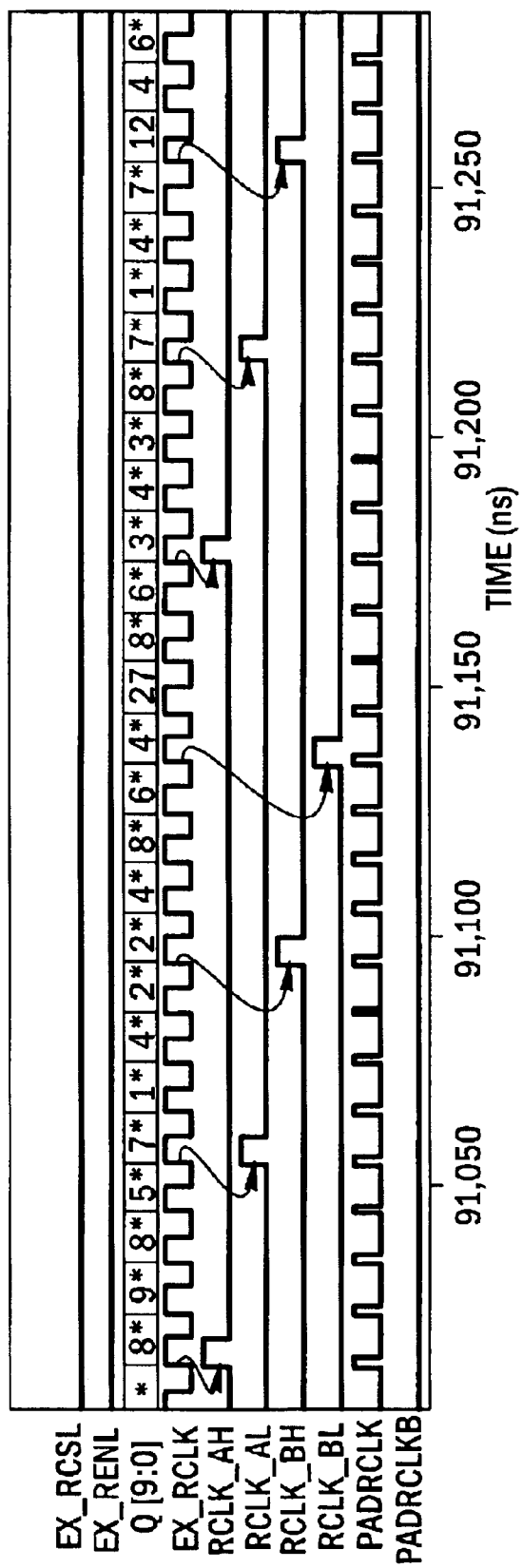
FIG. 8 is a timing diagram that illustrates operations performed by the FIFO memory device of FIG. 2 when the memory device is configured in a x10 single data rate (SDR) read mode of operation.

The timing diagrams of FIGS. 7–8 are similar to the timing diagrams of FIGS. 5 and 6A–6B, however, the write and read modes have been changed from ×40 DDR write and read to ×10 SDR write and read. In particular, FIG. 7 is a timing diagram that illustrates single data rate write operations with ×10 bus matching. As illustrated, four consecutive internal write counter clock signals WCNTRCLK are needed before a ×40 write operation is performed to one of the memory devices AH, AL, BH and BL. Each leading edge of the write counter clock signal WCNTRCLK latches in 10 new bits of data from the data input port DIN[9:0]. In response to each leading edge of the write counter clock signal WCNTRCLK, the clock control circuit 136 of FIG. 3 generates a respective one of the sixteen (16) data input latch signals DINLDA[7], DINLDA[6}, . . . , DINLDB[7], . . . , DINLDB[0]. Four of these signals will need to be received by the slave latch 142 in sequence before a ×40 write operation can be performed to the memory devices AH, AL, BH and BL.

FIG. 8 is a timing diagram that illustrates single data rate read operations with ×10 bus matching. As illustrated, four consecutive external read clock signals EX_RCLK are needed before a ×40 read operation can be performed from the memory devices AH, AL, BH and BL. Because the single data rate mode is active, the complementary active high pad read clock signal PADRCLKB is not generated, which means the second output register 182b remains inactive. Each leading edge of the external read clock signal EX_RCLK triggers an active high pulse on the pad read clock signal line PADRCLK and the latching of ×10 bits of new read data into the first output register 182a and to the output port Q[9:0].

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit chip, comprising:
a first-in first-out (FIFO) memory device that is configured to support all four of the following FIFO memory modes: (1) DDR write mode with DDR read mode, (2) DDR write mode with SDR read mode, (3) SDR write mode with DDR read mode and (4) SDR write mode with SDR read mode.

2. The integrated circuit chip of claim 1, further comprising flag logic that is configured to evaluate an empty condition in the FIFO memory device by comparing a write counter value that is generated off a trailing edge of a write clock signal against a read counter value that is generated off a leading edge of a read clock signal when the FIFO memory device is disposed in the DDR write mode.

3. The integrated circuit chip of claim 2, wherein said flag logic is configured to evaluate a full condition in the FIFO memory device by comparing a read counter value that is generated off a trailing edge of the read clock signal against a write counter value that is generated off a leading edge of the write clock signal when the FIFO memory device is disposed in the DDR read mode.

4. The integrated circuit chip of claim 1, further comprising flag logic that is configured to evaluate a programmable almost empty condition in the FIFO memory device by comparing a write counter value that is generated off a trailing edge of a write clock signal against a read counter value that is generated off a leading edge of a read clock signal when the FIFO memory device is disposed in the DDR write mode.

5. The integrated circuit chip of claim 4, wherein said flag logic is further configured to evaluate a programmable almost full condition in the FIFO memory device by comparing a read counter value that is generated off a trailing edge of the read clock signal against a write counter value that is generated off a leading edge of the write clock signal when the FIFO memory device is disposed in the DDR read mode.

6. The integrated circuit chip of claim 1, wherein the FIFO memory device comprises a quad arrangement of multi-port memory devices therein.

7. The integrated circuit chip of claim 6, wherein each of the multi-port memory devices comprises a respective pair of quad-port cache arrays.

8. An integrated circuit chip, comprising:
a first-in first-out (FIFO) memory device that is configured to support all four of the following FIFO operating modes: (1) DDR write mode with DDR read mode that is asynchronously timed relative to the DDR write mode, (2) DDR write mode with SDR read mode that is asynchronously timed relative to the DDR write mode, (3) SDR write mode with DDR read mode that is asynchronously timed relative to the SDR write mode, and (4) SDR write mode with SDR read mode that is asynchronously timed relative to the SDR write mode.

9. The integrated circuit chip of claim 8, further comprising flag logic that is configured to evaluate an empty condition in the FIFO memory device by comparing a write counter value that is generated off a trailing edge of a write clock signal against a read counter value that is generated off a leading edge of a read clock signal when the FIFO memory device is disposed in the DDR write mode.

10. The integrated circuit chip of claim 9, wherein said flag logic is configured to evaluate a full condition in the FIFO memory device by comparing a read counter value that is generated off a trailing edge of the read clock signal against a write counter value that is generated off a leading edge of the write clock signal when the FIFO memory device is disposed in the DDR read mode.

11. The integrated circuit chip of claim 8, further comprising flag logic that is configured to evaluate a programmable almost empty condition in the FIFO memory device by comparing a write counter value that is generated off a trailing edge of a write clock signal against a read counter value that is generated off a leading edge of a read clock signal when the FIFO memory device is disposed in the DDR write mode.

12. The integrated circuit chip of claim 11, wherein said flag logic is further configured to evaluate a programmable almost full condition in the FIFO memory device by comparing a read counter value that is generated off a trailing edge of the read clock signal against a write counter value that is generated off a leading edge of the write clock signal when the FIFO memory device is disposed in the DDR read mode.

13. The integrated circuit chip of claim 8, wherein the FIFO memory device comprises a quad arrangement of multi-port memory devices therein.

14. The integrated circuit chip of claim 13, wherein each of the multi-port memory devices comprises a respective pair of quad-port cache arrays.

15. An integrated circuit chip, comprising:
a FIFO memory device that is configured to support all four of the following combinations of write and read operations: (1) overlapping DDR write and DDR read operations that are asynchronously timed relative to each other, (2) overlapping DDR write and SDR read operations that are asynchronously timed relative to each other, (3) overlapping SDR write and DDR read operations that are asynchronously timed relative to each other, and (4) overlapping SDR write and SDR read operations that are asynchronously timed relative to each other.

16. The integrated circuit chip of claim 15, wherein said FIFO memory device further comprises flag logic that is configured to evaluate an empty condition in said FIFO memory device by comparing a write counter value that is generated off a trailing edge of a write clock signal, which synchronizes the write operations, against a read counter value that is generated off a leading edge of a read clock signal, which synchronizes the read operations, when said FIFO memory device is disposed in a DDR write mode of operation.

17. The integrated circuit chip of claim 16, wherein said flag logic is further configured to evaluate a full condition in said FIFO memory device by comparing a read counter value that is generated off a trailing edge of the read clock signal against a write counter value that is generated off a leading edge of the write clock signal when said FIFO memory device is disposed in a DDR read mode of operation.

18. The integrated circuit chip of claim 15, wherein said FIFO memory device further comprises flag logic that is configured to evaluate a programmable almost empty condition in the FIFO memory device by comparing a write counter value that is generated off a trailing edge of a write clock signal, which synchronizes the write operations, against a read counter value that is generated off a leading edge of a read clock signal, which synchronizes the read operations, when the FIFO memory device is disposed in a DDR write mode of operation.

19. The integrated circuit chip of claim 18, wherein said flag logic is further configured to evaluate a programmable almost full condition in said FIFO memory device by comparing a read counter value that is generated off a trailing edge of the read clock signal against a write counter value that is generated off a leading edge of the write clock signal when said FIFO memory device is disposed in a DDR read mode of operation.

20. The integrated circuit chip of claim 15, wherein said FIFO memory device comprises a quad arrangement of multi-port memory devices therein.

21. The integrated circuit chip of claim 15, wherein said FIFO memory device comprises at least one multi-port cache memory array therein.

* * * * *